(12) United States Patent
Yeung et al.

(10) Patent No.: US 11,943,335 B2
(45) Date of Patent: *Mar. 26, 2024

(54) SYSTEMS AND METHODS FOR LINKAGE DATA ELEMENTS

(71) Applicant: MEGACHAIN INC., Vancouver (CA)

(72) Inventors: Shing Yu Yeung, Vancouver (CA); Clive Richard Wright, Vancouver (CA)

(73) Assignee: MEGACHAIN INC., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/100,350

(22) Filed: Jan. 23, 2023

(65) Prior Publication Data

US 2023/0163950 A1    May 25, 2023

Related U.S. Application Data

(63) Continuation of application No. 16/779,029, filed on Jan. 31, 2020, now Pat. No. 11,563,561.

(60) Provisional application No. 62/799,589, filed on Jan. 31, 2019.

(51) Int. Cl.
| | |
|---|---|
| *H04L 9/06* | (2006.01) |
| *G06F 16/901* | (2019.01) |
| *G06F 16/9035* | (2019.01) |
| *G06F 16/953* | (2019.01) |
| *G06Q 20/40* | (2012.01) |
| *H04L 9/00* | (2022.01) |

(52) U.S. Cl.
CPC ........ *H04L 9/0643* (2013.01); *G06F 16/9027* (2019.01); *G06F 16/9035* (2019.01); *G06F 16/953* (2019.01); *G06Q 20/401* (2013.01); *H04L 9/0618* (2013.01); *H04L 9/50* (2022.05)

(58) Field of Classification Search
CPC ... H04L 9/3239; H04L 9/0643; H04L 9/3247; H04L 2209/38; H04L 67/10; H04L 67/1097; G06F 16/27; G06F 21/64; G06F 16/2246; G06F 16/134; G06F 16/2228; G06F 16/901; G06F 16/9027; G06F 16/9024; G06Q 20/389
See application file for complete search history.

(56) References Cited

U.S. PATENT DOCUMENTS

| | | | |
|---|---|---|---|
| 8,370,489 B2 | 2/2013 | Mazumdar et al. | |
| 9,830,593 B2 | 11/2017 | Myers | |
| 9,979,614 B2 | 5/2018 | Kalus et al. | |
| 11,153,097 B1 * | 10/2021 | Griffin | H04L 9/3263 |
| 11,329,828 B2 * | 5/2022 | Hwang | H04L 9/3239 |

(Continued)

FOREIGN PATENT DOCUMENTS

WO    WO-2019116248 A1 *   6/2019   ......... G06F 16/2246

*Primary Examiner* — Tae K Kim
(74) *Attorney, Agent, or Firm* — Norton Rose Fulbright Canada LLP

(57) ABSTRACT

An improved data structure approach, and corresponding computational systems and methods are described to provide a technical approach that can be used for improving computational performance where a blockchain data structure is being accessed continuously or periodically for validation of recordals of one or more events that have taken place. A hybrid off-chain (or off-contract)/on-chain solution is utilized to provide a mechanism for establishing data linkages between the off-chain (or off-contract) records and on-chain data payloads.

20 Claims, 13 Drawing Sheets

(56) References Cited

U.S. PATENT DOCUMENTS

| | | | |
|---|---|---|---|
| 2015/0245084 A1 | 8/2015 | Downing et al. | |
| 2017/0046651 A1 | 2/2017 | Lin et al. | |
| 2018/0167201 A1 | 6/2018 | Naqvi | |
| 2019/0013948 A1* | 1/2019 | Mercuri | G06F 16/27 |
| 2019/0303579 A1* | 10/2019 | Reddy | H04L 9/50 |
| 2020/0034457 A1* | 1/2020 | Brody | H04L 9/0819 |
| 2020/0059364 A1* | 2/2020 | Konda | H04L 9/3242 |
| 2020/0344061 A1* | 10/2020 | Hwang | H04L 9/0637 |
| 2021/0165890 A1* | 6/2021 | Schvey | G06F 21/6218 |
| 2021/0326815 A1* | 10/2021 | Brody | G06Q 20/382 |

* cited by examiner

SYSTEMS AND METHODS FOR LINKAGE DATA ELEMENTS

CROSS REFERENCE

This application is a Continuation of U.S. application Ser. No. 16/779,029 filed on Jan. 31, 2020, which is a non-provisional of, and claims all benefit to, including priority to, U.S. Application No. 62/799,589, entitled "SYSTEMS AND METHODS FOR LINKAGE DATA ELEMENTS", dated Jan. 31, 2019, incorporated herein by reference.

FIELD

Embodiments of the present disclosure generally relate to the field of computer-based data structures, and more specifically, embodiments relate to devices, systems and methods for improved reference linkage data elements for utilization with blockchain data structures.

INTRODUCTION

A company interacting with public Internet users through various communications means, for example, a public website or an application programming interface (API), requires a method and apparatus to record interactions with and among its users.

The parties involved may demand these records to prove interactions that result in payments sent or received and/or goods and services exchanged.

The records require linkages set up between various records that are proofs of the interactions that have taken place, and these linkages can be traversed in some aspects to identify all related events.

For example, an organization may make a claim to reimbursement in respect to targeted user interactions in relation to online purchasing interactions in an online marketing ecosystem resultant from an online advertising campaign.

SUMMARY

An improved data structure approach, and corresponding computational systems and methods are described in various embodiments. In particular, the data structures and systems described herein are a technical approach that can be used for improving computational performance where a blockchain data structure is being accessed continuously or periodically for validation of recordals of one or more events that have taken place. The structural benefits of using one or more public blockchain data structures (e.g., difficulty in repudiation, immutability, decentralization, security) can be utilized by adding transaction blocks having payloads associated with interaction tracking, for example.

A potential use case is tracking user interactions in an online marketing ecosystem. In this example, user interactions may be tracked in accordance with evidentiary recordals made on a blockchain. Elements of information, such as click-throughs, actualized purchases, referral links being sent, state changes in orders, order reimbursement instructions. These elements of information can be tracked, for example, using code snippets (e.g., HTML codes), tracking pixels, cookies, among others. As users interact with a webpage, these aspects may be captured as transaction evidence payloads storing data representations that the interactions took place.

Existing methods that persist to files or databases in computer systems do not satisfy the needs because with sufficient access privileges the database can be modified. Other methods use a blockchain to store the records.

The transaction evidence payloads, for example in this use case, can be provided to the blockchain to be stored. The technologies implemented by a blockchain protect records stored on it, termed statements herein, from tampering. A blockchain provides audit proof and consistency proof features that satisfy the irrevocability and provable auditability requirements. Blockchain data structures are updated as blocks storing transaction information and various payloads are sequentially added, for example, using cascaded hashing, such that the blockchain itself, when stored on distributed ledgers, for example, provides a computationally robust mechanism for storing information that is difficult to repudiate. The use of techniques such as cascaded hashing, consensus and propagation mechanisms help improve the robustness of the blockchain data structures.

However, a technical challenge arises when the blockchain data structures are used to store information on the payloads of the blockchain data structures, which may no longer be sequential in time or contemporaneously added to the blockchain in transaction blocks. This can occur, for example, in relation to public blockchain data structures, such as Ethereum. However, the records stored on the public blockchain data structures are difficult to efficiently parse/refer to, for example, where the evidentiary documentation stored on the various blocks are stored in a haphazard manner across the public blockchain data structures.

This technical problem can be especially challenging where the evidentiary documentation is linked together. In the non-limiting example use case relating to offers and referrals based on web-based offers and tracked records, traversing the records can be especially challenging as they are not linked together from the information stored in the payloads of the transaction blocks on the public blockchain data structures.

A solution where the records binding all parties involved in an interaction are irrevocably stored and can be provably audited is presented in various embodiments described herein. The solution may be implemented as a method, a system, specially configured computing devices, and/or stored on computer-readable media as machine-interpretable instruction sets for controlling execution by one or more processors. The solution may, for example, be a computer component, module, or device that is adapted for retrofitting to a blockchain system through control signals sent across application programming interfaces (APIs).

Presented, in various embodiments, is an approach that stored statements created from a set of parties' interactions in one or more blockchains and in addition it introduces an innovative approach of also recording the statements as an assertion which is a binding of the statements and the identities of the parties involved in the interaction.

In accordance with a first aspect, the approach is a computer system that is configured for tracking one or more data linkages between one or more data structures stored on one or more external public blockchains. The computer system can be a computer server or a computing device, such as a portable computing device. The computer system has a computer processor (e.g., hardware computer processor) and computer memory operating with networking interface for integration with the computing nodes coupled to the distributed ledgers (e.g., external public blockchains). The computer processor is coupled to a storage device or medium such that data sets can be stored off-chain for use in later traversal of the external public blockchains to re-identify transactional evidence payloads.

Accordingly, the processor is configured to integrate with the external public blockchain (there may be one or more external public blockchains, according to various embodiments) to identify that an event has occurred based at least on data records corresponding to transactions stored on the external public blockchain. Events can include user actions on a website, such as those captured in interactions with tracking pixels, etc., webpage tags, cookies, referral links (e.g., HTML GET/POST). The processor then requests an allocation of a unique value corresponding to an assertion data object that is mined or will be mined onto the external public blockchain. As described in various embodiments, this is referred to as an "STLink". This unique value is utilized as a mechanism for identification of associations and data linkages between data elements, and is also represented on the blockchain as well (e.g., either mined contemporaneously or pre-mined).

The assertion data object is generated from the data records corresponding to the transactions of the event and the assertion data object includes an underlying set of one or more associated statement data objects represented in a data payload associated with the assertion data object. Each of the one or more statement data objects are allocated a corresponding separate unique value. For example, an offer's identity and its data content can be another STLink data element. State changes thereof, can be data elements, creditability ratings, etc. These can be traversed later to confirm that they did occur for payout.

The assertion data object (or a representation thereof) is stored on an off-chain database. Compressed representations can be used if storage costs are a consideration. The off-chain database can be provided on local or networked data storage devices, and can be a high availability or low cost device (especially relative to storing information on the external public blockchain, which could have cost considerations as each block transaction can require a payment of transaction fees, such as "gas"/Ether). Example off-chain databases can include relational databases, flat databases, peer to peer type distributed file systems (e.g., InterPlanetary File System) provided by a set of decentralized user-operators. The off-chain database is typically less computationally cumbersome than storage on the external public blockchain. Another option for the off-chain storage for another embodiment is the use of Ethereum log, which can be used to store application data. These approaches are cheaper than transaction data stored in a contract. Accordingly, in some embodiments, the off-chain database is replaced with an off-contract database (e.g., information that is not stored on a smart contract).

A data representation (e.g., a hash) of the assertion data object including the unique value corresponding to the assertion data object is recorded as a transaction on the external public blockchain. This recordal, for example, can include mining of a new block to be added to the external public blockchain that has the data representation. Given the costs of storing information thereon the external public blockchain, in some embodiments, only a compressed representation or message digest version of the assertion data object is stored thereon.

A representation of a transaction recordal receipt with the recorded data representation of the assertion data object is stored, on the off-chain database. The recordal receipt, for example, can be evidence of information stored thereon the external public blockchain at a storage layer (e.g., Ethereum base layer protocol stored on state machine mechanisms thereof). The information can be stored as permanent information on the external public blockchain, for example, mined thereon as transaction blocks.

As the data representation of the assertion data object is mined onto the external public blockchain, the external public blockchain becomes an immutable source (insofar as it is practically possible assuming stability of the underlying network) of ground truth. The transaction recordal receipt is associated with the assertion data object and the unique value corresponding to the assertion data object.

The one or more data linkages between the unique values corresponding to the assertion data object and the underlying set of one or more associated statement data objects are generated and stored on the off-chain database, as interconnected nodes of a m-ary tree. This allows the unique values (representing the STLinks described herein) to be utilized as a data object that can be traversed by a user to point towards specific transaction blocks and/or payloads stored on the external public blockchain. Accordingly, the m-ary tree and the one or more data linkages are traversable to identify the one or more data structures stored on the one or more external public blockchains relating to a specific unique value. The traversal of the unique values allows for an computational simpler approach to traverse the blockchain to validate the interconnections and to validate that the transactions did indeed take place—the data linkages provided by the unique values (STLinks) can be used as lookups against the blockchains using the transaction receipts.

The approach introduces the additional aspect of an assertion's ownership and its assignment to one or more asserting parties involved in the interaction, which can be provided through one or more improved data elements that include improved references.

This ownership grants the owning party the right in the system to claim irrefutably payments, goods and/or services that result from the interaction. This claim is made based on an assertion and its ownership, and encapsulated as a "Space-Time-Unique-Link", which refers to various embodiments of the data element (STLink).

The unique value corresponding to the assertion data object can be linked to a unique value corresponding to an owner profile, and the m-ary tree and the one or more data linkages are traversable using recursion based on the unique value corresponding to the owner profile to identify all transactions stored on the external public blockchain associated with the owner profile.

For example, if a particular individual wishes to request a payout based on transactions associated with his/her referral tracker (e.g., pixel 1×1 tag), the payout may need cross-verification. The off-chain storage can be accessed to obtain the m-ary tree of STLinks, and then the STLinks can be compared against transaction receipts stored thereon for a corresponding access of information stored on the external public blockchain(s) to confirm that the transactions/events did indeed occur before providing the payout.

As the m-ary tree can be complex due to the various types of events stored thereon the external public blockchain (e.g., link clicked, payout rate changed, purchase event occurred), the m-ary tree can be traversed, for example, treating a particular node of the m-ary tree as a root node upon which a tree traversal can take place in respect of leaf nodes. Example traversals can include breadth first traversals, depth first traversals, among others. In the context of a multi-layered implementation where there can be user profiles linked to one another (e.g., in a multi-level referral network), the user profiles can be linked such that sub-user profiles are leaf nodes in respect of the m-ary tree for an originator user profile. Accordingly, from a data structure perspective, the m-ary tree persists the originator→sub-user relationship such that the same traversal can be used for each. Traversal can be initiated from an initial node of the m-ary tree and includes an ordered traversal of one or more subtrees linked to the initial node. Accordingly, in some embodiments, the m-ary tree can be one with unbound root depth.

The STLink is a core feature for binding of one or more statements, one or more assertions, one or more identities, and a timestamp.

Embodiments described herein introduce a system that provides an online website for its users to interact towards the business of an enterprise. The interactions are received by the system as events. The events are processed and recorded on a blockchain for irrevocability and auditability by applying the method of this invention. The system can be configured to confirm all identified transactions stored on the external public blockchain associated with the owner profile, and only in response to a successful confirmation, transmit a control signal indicative of a release of assets quantified based at least on the corresponding data payloads of identified assertion data objects (e.g., release 10 MM USD only after successful confirmation).

Structural components can include a publically accessible website, a backend server system, a blockchain subsystem, used to interface to a public (or private) blockchain, a database, and a browser-based user interface client. The website can be configured with tracking mechanisms, such as tracking pixels, tracking codes, tags, among others. The system is not limited to using a singular blockchain subsystem—multiple blockchain subsystems can be used for recordal so long as transaction receipts can be received and used for identifying specific stored payloads on each of the blockchain subsystems for future confirmation.

In use, the system receives events resulting from user actions on the website. The event data is extracted and put into one or more statements. A statement is a contribution to an Assertion whose data content will be ultimately put onto a blockchain. Proof-of-origination is optionally applied to a statement, or to an assertion, by assigning it a globally unique number. The number can be supplied by the system, in some embodiments. Each of the one or more statement data objects can, in some embodiments, be also mined onto the external public blockchain and the corresponding representations in the data payload are transaction recordal receipts corresponding to the mining of each of the one or more statement data objects.

A new assertion is assembled as the collection of one or more statements that are freshly created from event data, plus one or more pre-existing statements, one or more pre-existing assertions, and a timestamp. The system stores the assertion and its content in an off-chain database.

The system then applies a data transformation method on the assertion's data content resulting in a data blob. The system submits the data blob to a blockchain in a transaction and stores the transaction receipt.

A unique number assigned to a statement or an assertion also requires irrevocability and auditability. In addition, a unique number's proof-of-origination is required, i.e. provided by the system provably. In one variation, a unique number is produced by the system by mining it onto a blockchain in-situ during an event's processing. In another variation, the number assigned is already mined and readily available at an event's processing. In yet another variation, pools of unique numbers are continuously mined by the system and allocated for assigning during event processing.

An example implementation of some embodiments is to record and track user interactions in an online marketing ecosystem. A user registered as a Vendor deposits one or more requests to other users, registered as a Marketer, to solicit the latter's aid to market products and/or services. The requests are called "Offers".

In one use case, an STLink is a reference data element attesting to the identity of a user. An offer's identity, as well as its data content, can be another STLink reference data element. An offer's state change, for example a vendor making it available to marketers, can be yet another STLink reference data element. A marketer accepting a published offer can be recorded in an STLink reference data element. In another use case, an STLink records an offer's creditability rating, which is a dynamic quantity, at a given time. In yet one more use case, one STLink records each change to the compensation rate paid out based on the varying performance achieved by the marketer.

The system operates in a manner transparent to registered users. Two main functions continuously and transparently operate as users interact: detect and receive events, and process and record outcomes of events on the blockchain. One or more STLinks are carried in an event and one or more STLinks are created during the event process and record functions.

The system is configured to interoperate with primarily one public blockchain, however, it may be configured to support more than one blockchain concurrently (including, for example, a mixture of private and public blockchains).

Corresponding methods, non-transitory computer readable media (e.g., storing machine interpretable instructions representative of computer program products to be executed on a computer processor), and processes are contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

An improved reference linkage data element, "space-time" link, STLink fulfills these functions: a reference externalized to the host system sent to parties for processed event's data plus any related context, a mechanism (e.g., means) to locate one or more keys for the system to lookup corresponding blockchain state which provides the immutable proof of the event data recorded, and the attribution of an STLink, and therefore of the event data recorded, to one or more parties, i.e. ownership. The STLink owner has the right to claim payments, goods, or services implicated or indicated by the data recorded.

An incoming event processed by the system can contain an arbitrary amount of data. This data is interpreted and processed by an application executing on the host system. At event processing, an arbitrary amount of context may be bound at the application's discretion. Examples are the determined identities of the parties involved and data from prior event processing contexts, i.e. other STLink reference data elements. This data is stored and organized by the data structure method in various embodiments.

Figure 1:
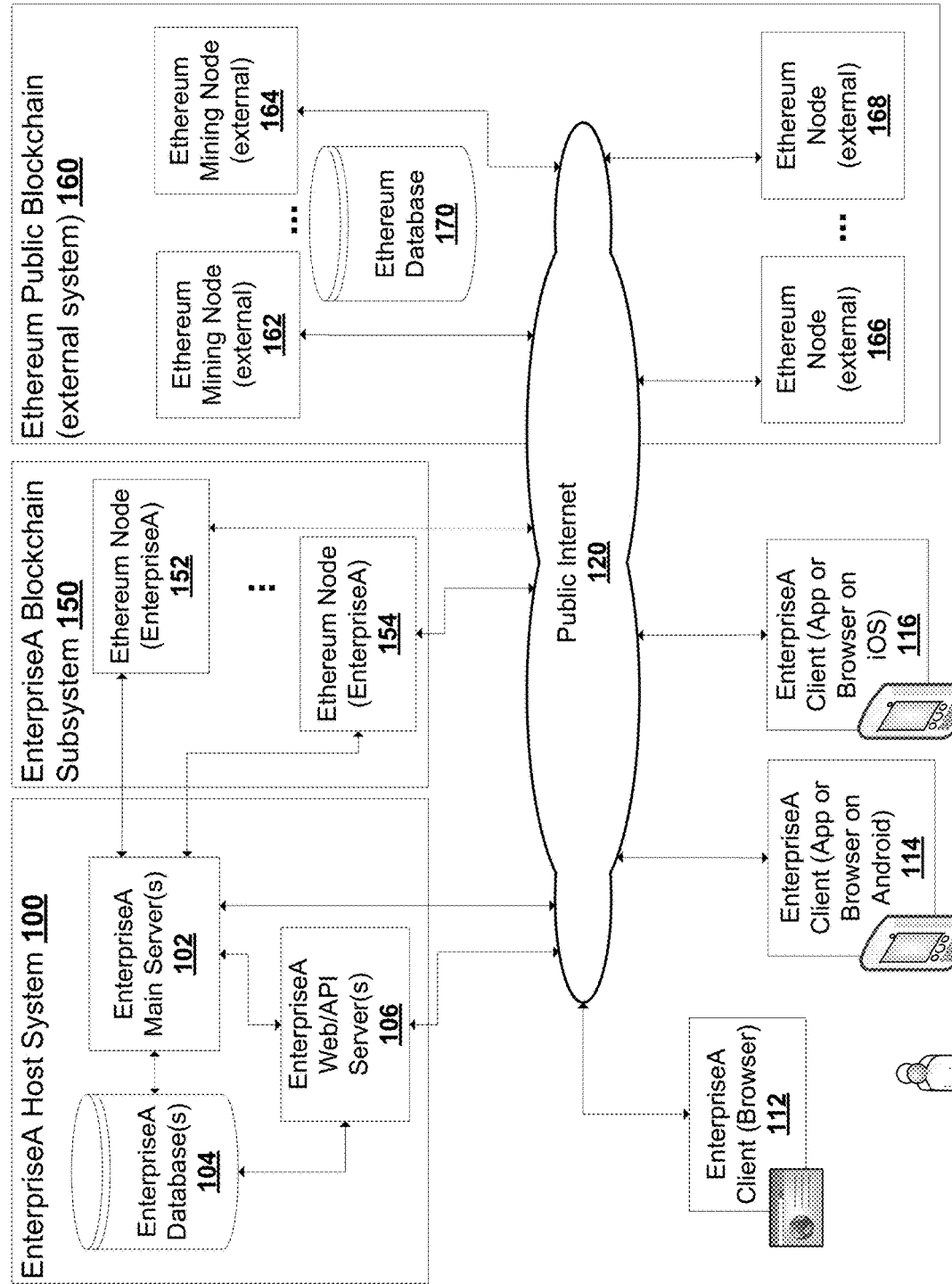
FIG. 1 is a block schematic diagram of an example system in which the invention may be implemented.

FIG. 1 is a block diagram of an example system. It comprises, but is not limited to, a host system 100 and one or more blockchain subsystems (e.g., Enterprise Blockchain subsystem 150), and an external public blockchain system 160 here illustrated as the public Ethereum blockchain 160.

The host system 100 comprises one or more host databases 104, one or more host main servers 102, and one or more Web/API servers 106. The blockchain subsystem 150 comprises one or more blockchain processing nodes 152, 154.

These nodes provide the host system 100 with the integration access to the functions of the external public blockchain 160 and its processing nodes 166, 168, mining nodes 162, 164, and the blockchain state data (e.g., stored on Ethereum Database 170), which is a logical representation of the blockchain's immutable data store.

Users 110 access the host system 100 from a browser 112 running on a desktop computer, from a mobile Android app or a browser running on an Android device 114, or from a mobile iOS app or a browser on an iOS device 116.

In use, the host system 100, the blockchain subsystem 150, and the public blockchain 160 interoperate to continuously perform steps of a method including, but not limited to raise, detect, receive, and process events triggered by the user interactions and by the operation of the system.

The system 100 is configured to extract data from the events to create one or more statements, each optionally assigned a unique number, and create one or more assertions also each assigned a unique number. An assertion binds the fresh set of statements with assertions or statements from earlier events' processing, any involved parties' identities determined. The system 100 assigns one or more parties as an assertion's owner. The system 100 records the assertion(s) on the blockchain by submitting and completing one or more successful blockchain transactions. The transaction receipt is stored by the system 100 along with its corresponding assertion to the host database 104.

The main server 102 obtains a receipt after a transaction is mined successfully. The identity of a party is an STLink created at a prior time. A party is typically a person but can be an intelligent software entity capable of interacting with users or other entities in the online ecosystem. It may reside in the host system 100, the blockchain subsystem 150, or in an external system that communicates to the system via an API server 106.

To satisfy proof-of-origin, it is important to be able to prove that the unique numbers assigned were created by the host system 100.

The unique numbers therefore are subject to the same irrevocability and auditability requirements, i.e. they also need to be mined onto a blockchain. This can be done in-situ at event processing time or pre-mined in pools by the system. By allocating numbers from a pre-mine pool for use as identities, the latency of the overall events processing cycle can be minimized significantly.

In a variation, the unique number allocation event is mined on a blockchain individually, or it may be done in bulk based on criteria including but not limited to interval elapsed since allocation, count of allocated numbers, SLA tier associated with the particular events' processing, and one or more custom defined criteria.

In another variation, more than one blockchain provider may be concurrently integrated to store the statements and assertions, or a subset selected by various criteria.

An online marketing ecosystem utilizes this invention where one class of users, vendors, who makes products or offers services are aided by another class of users, marketers, to promote the products and services to general consumers. A vendor agrees to compensate a marketer for successful achievement of milestones defined in the offer. An STLink records a vendor's publishing of offer, another STLink records a marketer accepting a published offer to promote, yet another STLink records a consumer's action on a promoted offer, for example, purchase of a product. While these the are the key target events recorded, an STLink can be used to record any and all events that occur in the system from any use case of interest.

Another use case for an STLink is to record one or more measures, determined dynamically by the system, against a marketer's promotional reach and ability to market select products or services categories.

This measure can be based on information extracted from bulk database scrapes/retrievals including but not limited to accessing data sets held by third parties through various application programming interfaces. In another use case, an STLink records a published offer's credibility rating.

This measure can also change dynamically based on information extracted by the system among interactions of users and consumers on offers, including but not limited to number of views, discussions/comments added, number of conversions, among others. In yet one more use case, the STLink records the compensation rate paid out to a marketer upon achieving offer milestones.

The rate can be based on including but not limited: to number of clicks, number of conversions, number of user-to-user or consumer-to-consumer referrals, among others.

This rate formula may be individualized to an individual marketer and, as permitted by offer creator, can be changed dynamically based on the marketer's performance as determined by the system or at the discretion of the offer creator. Tracking of these elements can be conducted on a webpage or a web browser, for example, through web beacons (e.g., cookies, pixel tags, page tags, JavaScript tags, among others).

A challenge with prior approaches (e.g., non-blockchain approaches) is that disputes in respect of the counting methodology and counting evidence are common. Content publishers are incentivized to undercount and undercompensate content creators/referral originators, and the content creators/referral originators encounter difficulties in establishing evidence that the referral events for counting indeed occurred. This problem is exacerbated where the content publishers/ad networks store the event data on their own local storage, which is then subject to potential tampering and repudiation.

As noted above, blockchain solutions such as Ethereum may be helpful to provide a technical solution to the challenges noted above. As described in various embodiments, a specific technical approach is proposed that integrates with the blockchain solutions in a technically robust way to efficiently (computationally) store certain information on the blockchains to establish time-stamped evidence that can be used to improve trust between both parties. As blockchain transactions are computationally expensive, an improved hybrid off-chain/on-chain solution is described that utilizes m-ary trees to provide a cross-referenceable data structure that has specific technical improvements to aid in ease of potential traversal. As described in variant embodiments, specific approaches are also described that aid in the reduction of overall data storage/payload sizes for the on-chain storage.

Figure 2:
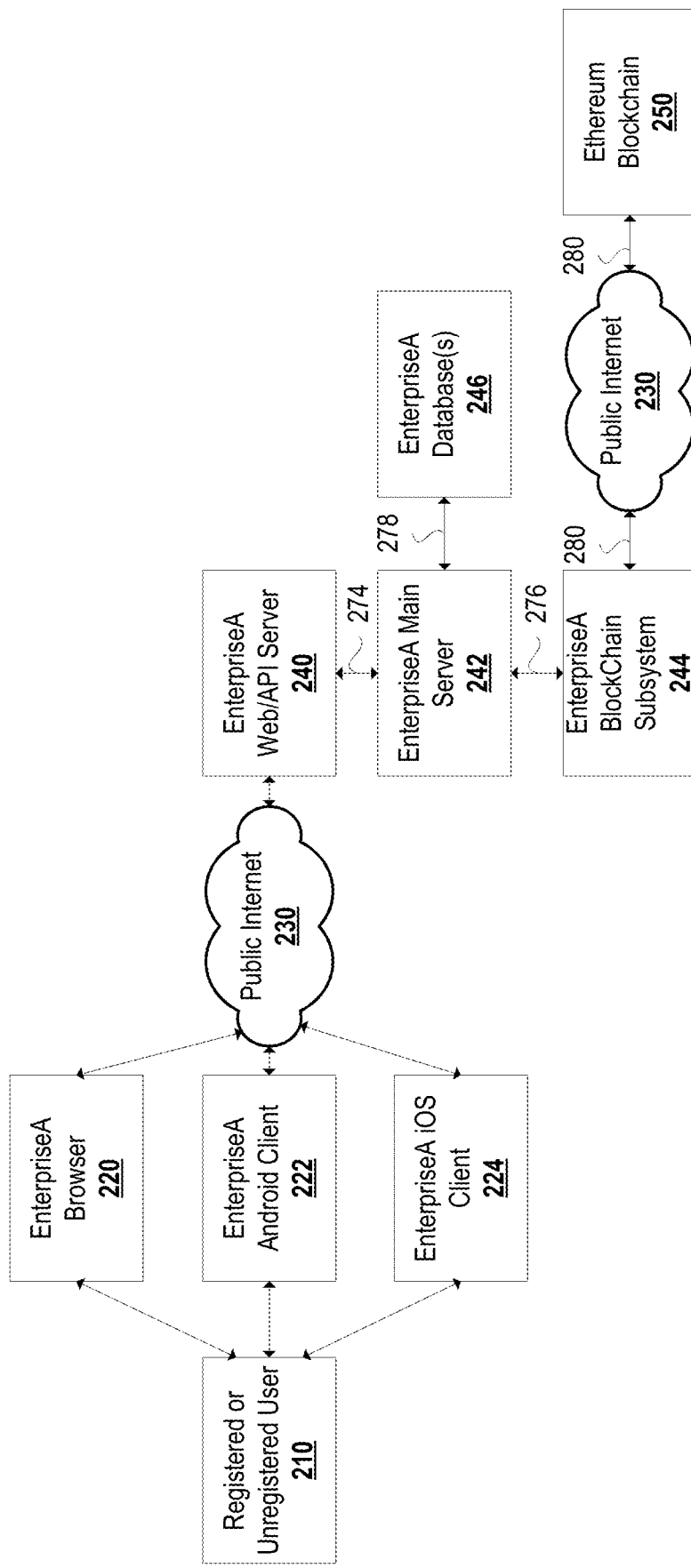
FIG. 2 is a block diagram of the system, according to some embodiments, illustrating the use of the invention and its function in the system.

FIG. 2 is a block diagram of an example system, according to some embodiments. A registered user 210, who is a vendor or a marketer, logs into the web server 240 from a desktop browser 220, from an Android mobile app 222, or from an iOS mobile app 224 via the public internet 230.

The web server 240 retrieves and presents data items on client 220, 222, or 224 from the database 246 via the main server 242. The user selects and invokes one or more actions on a data item presented in the client 220, 222, or 224. The action is sent to and arrives at the web server 240 as an incoming message event. The event is sent to and processed by one or more applications executing in the main server 242. Interfaces 274, 276, 278, and 280 are utilized for communications between computing components and devices.

One or more STLinks are created as a result by the main server 242 and corresponding records are mined onto a blockchain 250 via the blockchain subsystem 244 and the public internet 230.

Figure 3:
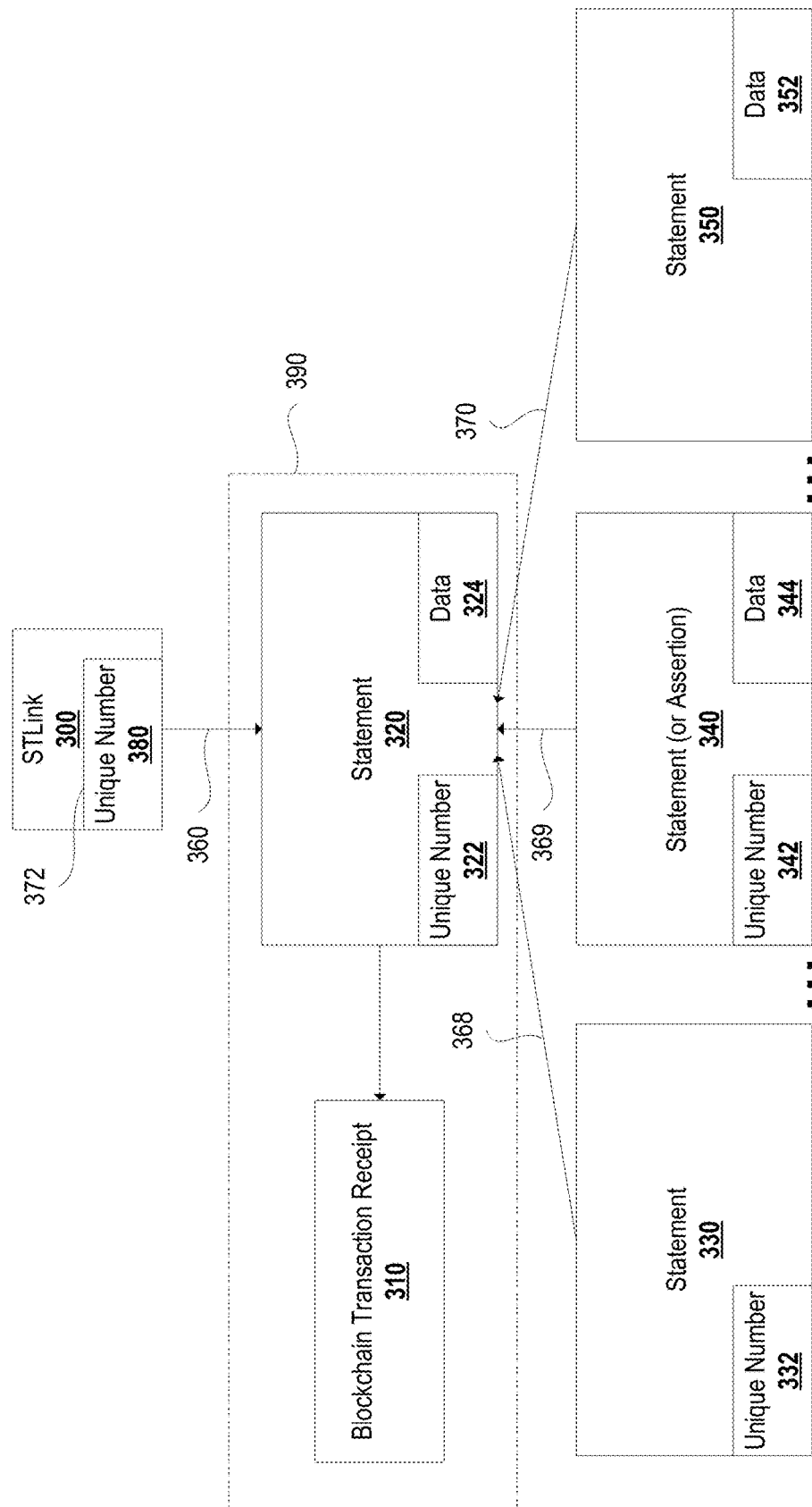
FIG. 3 is a diagram of the structural content pointed to by an STLink, according to some embodiments.

FIG. 3 is a block diagram of the STLink 300, Assertion 320, and Statement 330, 340, 350 illustrative of their relationships, according to some embodiments. When an STLink 300 is externalized, it may be optionally assigned its own unique number 380 and is a reference 360 to an assertion 390.

An STLink is carried in a URL/URI and may be shared with multiple receiving parties. STLink ownership is not applicable when externalized. Internally, an STLink may be associated with zero or more owners. Any direct owners of an STLink can be associated with an identity embodied by an STLink's unique number, for instance.

Associating an STLink to owner identities internal to the system may be achieved, for example, with a relational database schema and table data.

If used only internally, the STLink's unique number 372 is optional as its identity can adopt from that 322 of the assertion 390, therefore statement 320, it points 360 to. An owner in the system, when externalized, can also be represented by an STLink 400, see FIG. 4, in the system as illustrated in various embodiments.

An STLink 300 is a reference 360 to an assertion 390 or a statement 320 in the system. A statement comprises a unique number 322, which is its non-externalized identity, and the data it asserts 324. This data 324 is a collection of items each is one of event data contained in-situ, or are extracted and put into one or more statements 330, or an assertion (or a statement) 340 from earlier events' processing. An assertion 390 is a statement that is successfully mined onto a blockchain, it has an associated transaction receipt 310. A mined statement results in an assertion.

A statement 340 may comprise both a unique number 342 and a data items collection 344, or at least one of the two. If it is the latter, one can use 330, 340 for identity reference usage, and to collect data not requiring identification 350 in the statement scope. If both are present, the unique number associates the data collection with an identity recognized by the system.

In short, an STLink 300 refers to a logical m-ary tree structure 360, 368, 369, 370 where each of its nodes 320, 330, 340, or 350 is an assertion, or a statement, each having an optional identification. Where a node is an assertion or a statement that contains a data collection, the logical structure continues by recursing into it. The complete traversal of this tree is the total statement of claims attributable to the STLink.

The following are exemplary statements and an assertion illustrated in JSON format. In these examples, the unique number assigned to each statement are exemplary here each as a SHA256 hash of the Unix epoch. These unique numbers have been previously mined onto a blockchain in pools by the system. The reason for the unique numbers' mining is so their origination can be provably attributed to the system performing the blockchain transactions.

Statements are mined into assertions at their respective processing that is separate from the unique number pools' mining. This separation allows the system to decouple processing timeliness wanted of the uniqueness assignment to and the statements' mining onto a blockchain into assertions.

This is a data-only statement 350.

```
350
{
  352
  "data" : [
      { "first" : "John" },
      { "last": "Doe" },
      { "addr1": "1122 Water Street" },
      { "addr2": "Vancouver, B.C." },
      { "addr3": "V6C 2L1" },
      { "profile": [
          { "occupation" : "self-employed" }
      ] },
      { "timestamp" : "1579569554516678"}
  ]
}
```

Below is a statement 340 comprising an unique number 342 and a data collection 344. Section [0090] further elaborates on this example.

```
340
{
  342
  "uid" : "4c2f6296bf6accf5003ecd019aacd1b3d0e485586a10fc8fead719f291a1bb03",
  344
  "data" : {"person": [
      {"first": "John"},
      {"last": "Doe"},
      {"addr1": "1122 Water Street"},
      {"addr2": "Vancouver, B.C."},
      {"addr3": "V5M 2N6"},
      {"profile": [
          {"occupation": "self-employed"}
      ]},
      {"timestamp": "1579569554516678"}
  ]}
}
```

Below is a statement with only an unique number 330. It has no associated data. This Identity-only statement refers to a node in zero or more m-ary tree in the system, i.e. what is referenced may or may not pre-exist.

```
330
{
  332
  "uid": "723108119e11efd41e280f34d6813f962f1e0838494d1c813c1e28b84bd1d72c"
}
```

Assertion 390—is a statement 320 associated with the transaction receipt 310 from the former's successful mining onto a blockchain, here corresponded to an Ethereum blockchain transaction hash value. Note an assertion is data-only statement. Below shows this exemplary assertion in JSON format.

```
390
{"data": {"assertion": [
  310
  {"txHash": "0xb302681699f1b88502c3ac4182b3d461ebfa7036170bee1027d2a0929f24f65f"},
  320
  {
    "uid": "4c2f6296bf6accf5003ecd019aacd1b3d0e485586a10fc8fead719f291a1bb03",
    "data": {"person": [
        {"first": "John"},
        {"last": "Doe"},
        {"addr1": "1122 Water Street"},
        {"addr2": "Vancouver, B.C."},
        {"addr3": "V5M 2N6"},
        {"profile": [
            {"occupation": "self-employed"}
        ]},
        {"timestamp": "1579569554516678"}
    ]}
  }
]}}
```

A compact representation employing identity-only statement as a reference to John's identity statement, in lieu of statement data contained in-situ.

```
{"data": {"assertion": [
  {"txHash": "0xb302681699f1b88502c3ac4182b3d461ebfa7036170bee1027d2a0929f24f65f"},
  {"reference": {"uid": "4c2f6296bf6accf5003ecd019aacd1b3d0e485586a10fc8fead719f291a1bb03"}}
]}}
```

Figure 4:
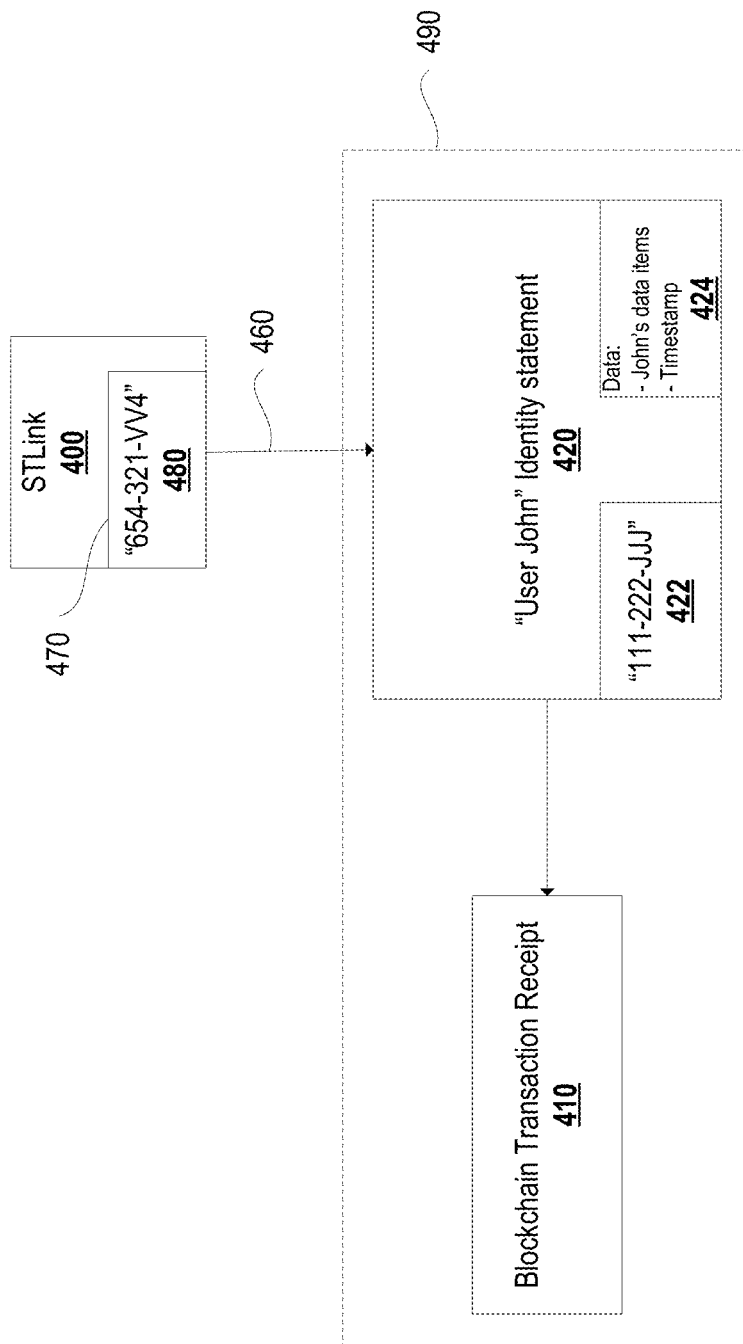
FIG. 4 is a diagram of an exemplary STLink instance representing an event where a user is assigned an identity in the system, according to some embodiments.
Figure 9:
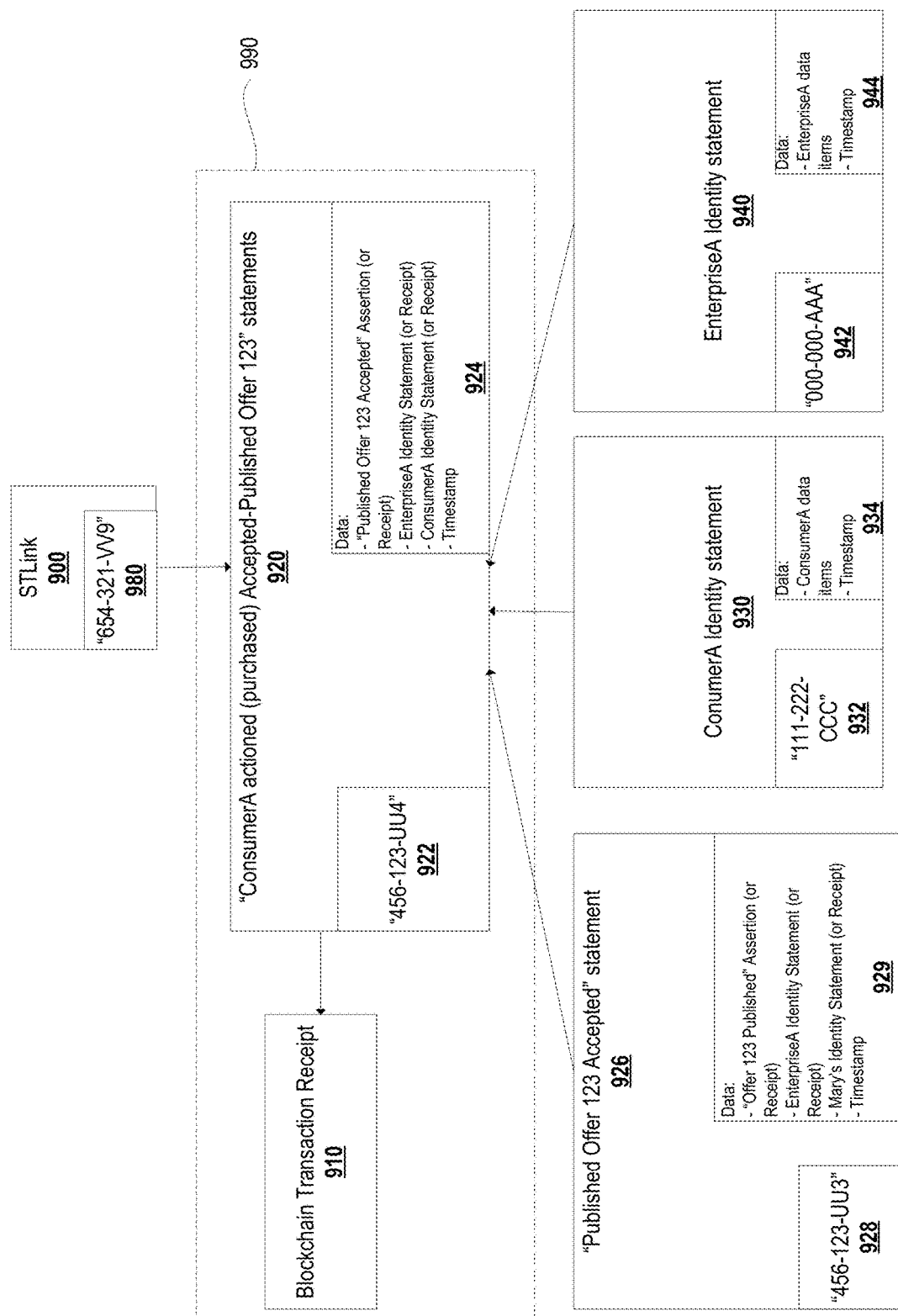
FIG. 9 is a diagram of an exemplary STLink instance representing an event where a consumer has acted on a promoted offer in the system, according to some embodiments.

FIG. 4 through to FIG. 9 to follow are all exemplary illustrations of the STLink concept of FIG. 3, each illustrative of an exemplary business domain use case, in this case online marketing, highlighting the usage variations provided by the STLink.

FIG. 4 is a block diagram of an exemplary STLink instance 400, illustrative of an statement 420 by the system's recording of an identity assignment event to a user ("John"), according to some embodiments. The user's identity is the assigned unique number 422. It includes the user's data items 424, for example first name, last name, address, phone number, etc., and a timestamp when the record was processed.

Below is a representation of 420 in JSON format.

```
420
{
  422
  "uid" : "4c2f6296bf6accf5003ecd019aacd1b3d0e485586a10fc8fead719f291a1bb03",
  424
  "data" : {"person": [
    {"first": "John"},
    {"last": "Doe"},
    {"addr1": "1122 Water Street"},
    {"addr2": "Vancouver, B.C."},
    {"addr3": "V5M 2N6"},
    {"profile": [
      {"occupation": "self-employed"}
    ]},
    {"timestamp": "1579569554516678"}
  ]}
}
```

The record is mined onto a block and the system obtains a transaction hash from receipt 410, here shown as the transaction's hash value from the Ethereum blockchain. Below is representation in JSON format:

```
490
{"data": {"assertion": [
  410
  {"txHash": "0xb302681699f1b88502c3ac4182b3d461ebfa7036170bee1027d2a0929f24f65f"},
  420
  {
    422
    "uid" : "4c2f6296bf6accf5003ecd019aacd1b3d0e485586a10fc8fead719f291a1bb03",
    424
    "data": {"person": [
      {"first": "John"},
      {"last": "Doe"},
      {"addr1": "1122 Water Street"},
      {"addr2": "Vancouver, B.C."},
      {"addr3": "V5M 2N6"},
      {"profile": [
        {"occupation": "self-employed"}
      ]},
      {"timestamp": "1579569554516678"}
    ]}
  }
]}}
```

Again, an assertion in compact JSON representation:

```
490
{"data": {"assertion": [
  410
  {"txHash": "0xb302681699f1b88502c3ac4182b3d461ebfa7036170bee1027d2a0929f24f65f"},
  420
  {"reference": {"uid": "4c2f6296bf6accf5003ecd019aacd1b3d0e485586a10fc8fead719f291a1bb03"}}
]}}
```

An STLink is created to communicate the assertion that John is recognized as an identity in the system (assertion 490).

In some embodiments, the STLink created can be carried in a URI/URL and when clicked, logic running in the web page or app that returns to the system the STLink contents in a URL parameter. In some embodiments, a hash of the JSON representation below is used in the URI/URL.

Below are two exemplary STLinks. The first targets a scenario where identifying the source that clicked on a STLink is not of interest to the system. The source of the click is characterized by data available from the browser or app environment about the user that can be and are relayed by the page logic/app, for example: IP address, geolocation, user agent, and other data.

STLink in compact JSON representation, for assertion 490 above. Note this STLink has no unique number therefore has no identity.

```
400
{ 460
   "data": { "reference": {422
     "uid":
"4c2f6296bf6accf5003ecd019aacd1b3d0e485586a10fc8fead719f291a1bb03"}}
}
```

In the second targeted scenario, an STLink is itself assigned a unique number 480 so that each click by the characterized click source may be associated with this number. This association is subsequently used by the system to correlate and tracked the click source to the identities and claims pointed to by the STLink.

```
400
{ 480
  "uid": "8252ea277ebbe5a99e7368c1a0fa96c3f5105b3c03c5dd11f555490ee20ca335",
  460
  "data": { "reference": { 422
    "uid":
"4c2f6296bf6accf5003ecd019aacd1b3d0e485586a10fc8fead719f291a1bb03"}}
}
```

Note the use 470 of a unique number 480 in a STLink is discretionary and dependent on the particular business application or system goal.

In both cases above, the unique number 422, in this case of John's identity statement, is the target of the STLink reference 460. When the STLink is received by the system, it performs business processing informed by identities and statements extracted from the traversal of an m-ary tree of statements recursed into and whose root is indicated by STLink's referenced assertion/statement.

As illustrated above, note the structure of an STLink is also that of a statement. Because of this, where provable auditability is also wanted in some embodiments for an STLink, it may be also mined, i.e. become STLink statement becomes an STLink assertion.

Figure 5:
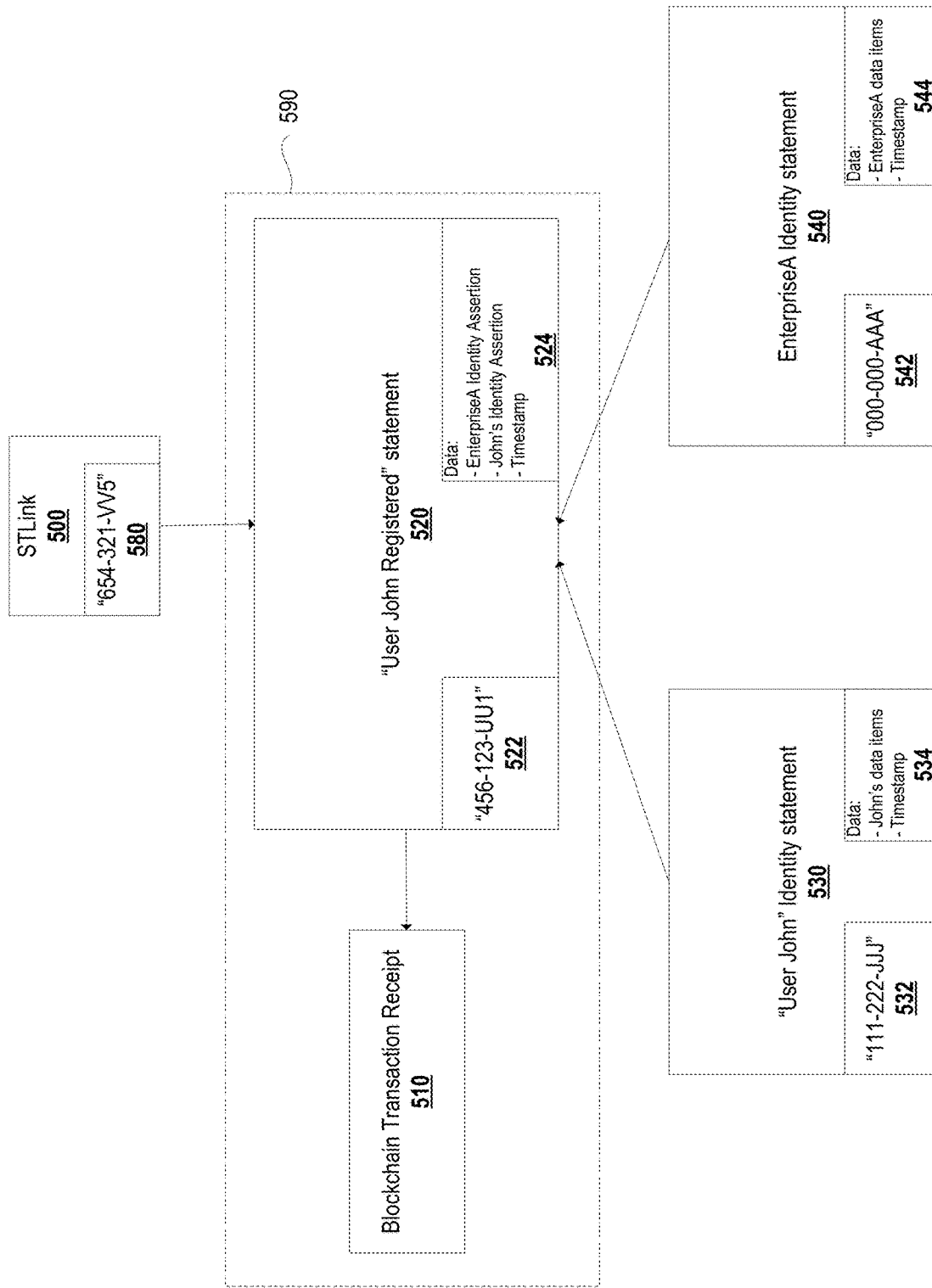
FIG. 5 is a diagram of an exemplary STLink instance representing an event where an identified user is registered with the system, according to some embodiments.

FIG. 5 is a block diagram of an exemplary STLink instance 500 having a unique number 580, illustrative of an assertion 590 by the system's recording of a statement 520 of the user registration event for John, whose identity was previously asserted by statement 530, to Enterprise A, previously asserted from statement 540, according to some embodiments.

A unique number 522 is assigned to this user registration event 520. The statement 520 is mined onto a block and the system obtains a transaction receipt 510. This is an example of a two-statement (at leaf level) assertion represented as a 3-node tree. f the child statements' data collection does not contain any STLinks or identity-only statements. If they do, while it remains a two-statement assertion, the depth of the tree increases."

Below is a JSON representation of statement 520.

```
520
{
   522
   "uid": "aa9507543b63b211aea4983f4becbd7a9382d8101ea22d4f3e68a7ffeead6568",
   524
   "data": {"user_registration": [
     540
     {
```

```
            542
            "uid": "1fe63d74cc177ed5652a5b9d02172365302a3021b2f39919793c673a31f84094",
            544
            "data": {"enterprise": [
                {"name": "Weevr Inc."},
                {"addr1": "3600 Robson Street"},
                {"addr2": "Vancouver, B.C."},
                {"addr3": "V7E 9Y8"},
                {"phone": "778-223-4400"},
                {"fax": "778-223-4401"},
                {"contact": "contact@weevr.io"},
                {"profile": [{"business": "online commerce"}]},
                {"timestamp": "1579568668230476"}
            ]}
        },
        530
        {
            532
            "uid": "4c2f6296bf6accf5003ecd019aacd1b3d0e485586a10fc8fead719f291a1bb03",
            534
            "data": {"person": [
                {"first": "John"},
                {"last": "Doe"},
                {"addr3": "V5M 2N6"},
                {"profile": [
                    {"occupation": "self-employed"}
                ]},
                {"timestamp": "1579569554516690"}
            ]}
        },
        {"timestamp": "1579568668483853"}
    ]}
}
```

With assertion in JSON:

```
{"data": {"assertion": [
  410
  {"txHash": " 0x8c8052f25766158d56cdfa9c23b1b13068cbe694d0eb9feaa787c5f918062851"},
  {"reference": {"uid": " aa9507543b63b211aea4983f4becbd7a9382d8101ea22d4f3e68a7ffeead6568"}}
]}}
```

40

And a STLink for 520 may be created

```
{
  "data": { "reference": {
    "uid": "aa9507543b63b211aea4983f4becbd7a9382d8101ea22d4f3e68a7ffeead6568"}}
}
```

In the example illustration above, the statement 520 contains the data content of its child statements 530, 540.

Figure 6:
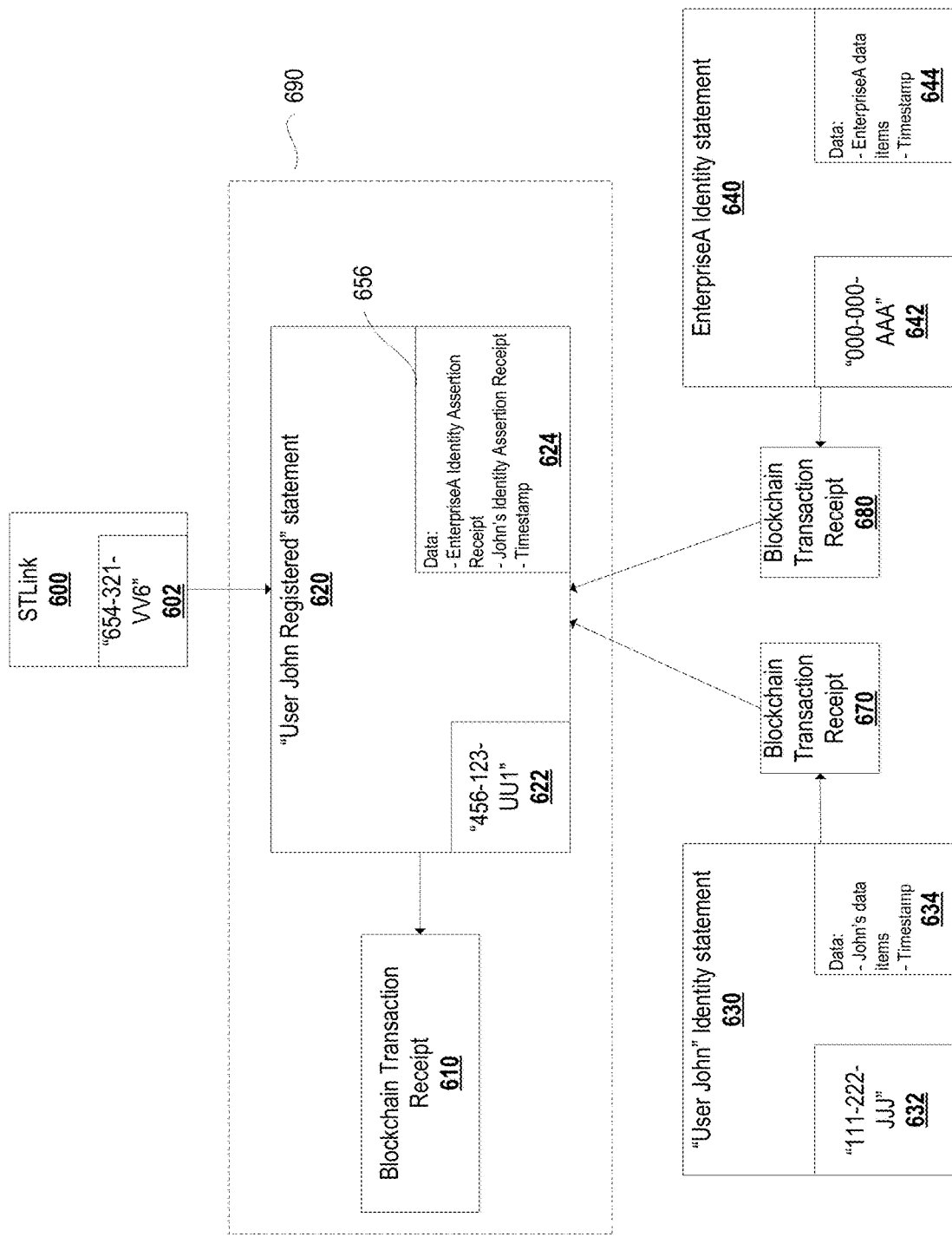
FIG. 6 is a diagram of an exemplary STLink instance representing an event where a user is registered with the system but receipts are used as data to the assertion instead of the input statements as shown in FIG. 5.

In a variation illustrated by FIG. 6, they are replaced by their respective hash from the blockchain transaction receipt. This allows the host system to avoid data duplication in the host database at the cost of a lookup receipt to assertion content if the latter is required by application context during processing.

FIG. 6 is a block diagram of an exemplary STLink instance 600 having a unique number 602, illustrative of an assertion 690 by the system's recording of a user ("John") registration event, according to some embodiments.

In this variation, in contrast to assertion 520 of FIG. 5, the blockchain transaction receipts 670, 680 (respective hash values) of child assertions 630 and 640, respectively, are the data items collected 656 in assertion 620 instead of their actual data content. As with 520, assertion 690 remains a two-statement assertion (at leaf level) and a three-node tree.

Below is a JSON representation of this variation.

```
620
{
  622
  "uid": "aa9507543b63b211aea4983f4becbd7a9382d8101ea22d4f3e68a7ffeead6568",
  624
  "data": {"user_registration": [
```

```
640
{
    "reference" : { "uid":
"1fe63d74cc177ed5652a5b9d02172365302a3021b2f39919793c673a31f84094"},
    "data": {"txHash":
"0x56ad94ef9b3f4c67cca0b7ed720e23bb10ea16e76da93b6fa825de03f670d360"}
},
630
{
    "reference" : {"uid":
"4c2f6296bf6accf5003ecd019aacd1b3d0e485586a10fc8fead719f291a1bb03"},
    "data": {"txHash":
"0x8c8052f25766158d56cdfa9c23b1b13068cbe694d0eb9feaa787c5f918062851"}
},
{"timestamp": "1579568668483853"}
]}
```

It is possible that some statements will never need to be mined onto a blockchain because their content do not require provable auditability in the operation of the enterprise. Because of this, no transaction receipts can apply. In yet another variation, a child data-only statement is hashed and the hash value included in the parent statement's data collection instead of the actual data.

Below is a JSON representation of this variation using content hashes.

```
620
{
    622
    "uid": "aa9507543b63b211aea4983f4becbd7a9382d8101ea22d4f3e68a7ffeead6568",
    624
    "data": {"user_registration": [
        540
        {
            "uid": "1fe63d74cc177ed5652a5b9d02172365302a3021b2f39919793c673a31f84094",
            "data": {"contentHash":
"d0cd1edce7ae0ae18deff7027cb1c1f0c5f580522b83cb5c9aa82332fb43d248"}
        },
        530
        {
            "uid": "4c2f6296bf6accf5003ecd019aacd1b3d0e485586a10fc8fead719f291a1bb03",
            "data": {"contentHash":
"723415ebb09218774a02554bab7fabba8ee79905b21a8e257b37e325ce6ff17a"}
        },
        {"timestamp": "1579568668483853"}
    ]}
}
```

As illustrated above, statement 540 hashed to the value below using SHA256 below:

```
540
{
    "uid": "1fe63d74cc177ed5652a5b9d02172365302a3021b2f39919793c673a31f84094",
    "data": {"enterprise": [
        {"name": "Weevr Inc."},
        {"addr1": "3600 Robson Street"},
        {"addr2": "Vancouver, B.C."},
        {"addr3": "V7E 9Y8"},
        {"phone": "778-223-4400"},
        {"fax": "778-223-4401"},
        {"contact": "contact@weevr.io"},
        {"profile": [{"business": "online commerce"}]},
        {"timestamp": "1579568668230476"}
    ]}
}
SHA356 hash of statement 540:
d0cd1edce7ae0ae18deff7027cb1c1f0c5f580522b83cb5c9aa82332fb43d248
```

And similarly for statement 530

```
530
{
  "uid": "1fe63d74cc177ed5652a5b9d02172365302a3021b2f39919793c673a31f84094",
  "data": {"enterprise": [
    {"name": "Weevr Inc."},
    {"addr1": "3600 Robson Street"},
    {"addr2": "Vancouver, B.C."},
    {"addr3": "V7E 9Y8"},
    {"phone": "778-223-4400"},
    {"fax": "778-223-4401"},
    {"contact": "contact@weevr.io"},
    {"profile": [{"business": "online commerce"}]},
    {"timestamp": "1579568668230476"}
  ]}
}
SHA356 hash of statement 530:
723415ebb09218774a02554bab7fabba8ee79905b21a8e257b37e325ce6ff17a
```

Figure 7:
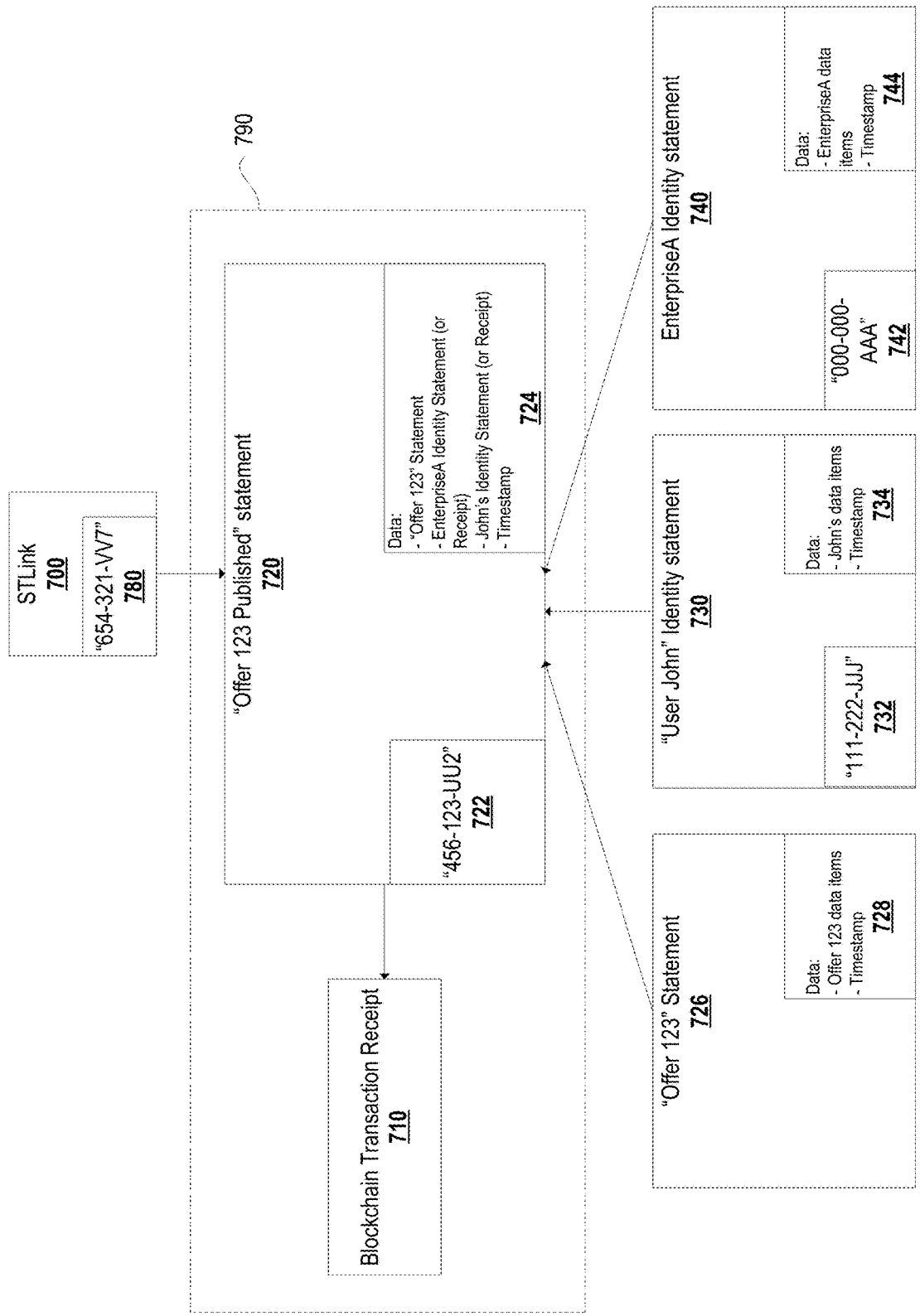
FIG. 7 is a diagram of an exemplary STLink instance representing an event where a vendor has published an offer in the system, according to some embodiments.

FIG. 7 is a block diagram of an exemplary STLink instance 700 having a unique number 780, illustrative of an assertion 790 by the system's recording an offer publish statement 720, the data of which is captured as statement 724, according to some embodiments, and comprises statements 726, 730, and 740. Assertion 790 is a statement with three child nodes (at leaf level) and a four-node tree. Below is a JSON representation illustrated with data content populated from all child statements: Offer123 726, John's identity 730, Weevr Inc. identity 740.

```
720
{
  "uid": "3a4269309ec24459fe26724c6ed85b76b3fd001934771b76cb60971dd4cc77fc",
  "data": {"published_offer": [
    730
    {"vendor": {
      "uid": "4c2f6296bf6accf5003ecd019aacd1b3d0e485586a10fc8fead719f291a1bb03",
      "data": {"person": [
        {"first": "John"},
        {"last": "Doe"},
        {"addr1": "1122 Water Street"},
        {"addr2": "Vancouver, B.C."},
        {"addr3": "V5M 2N6"},
        {"profile": [
          {"age": "42"},
          {"status": "single"},
          {"occupation": "self-employed"}
        ]},
        {"timestamp": "1579569554516678"}
      ]}
    }},
    740
    {"publisher": {
      "uid": "1fe63d74cc177ed5652a5b9d02172365302a3021b2f39919793c673a31f84094",
      "data": {"enterprise": [
        {"name": "Weevr Inc."},
        {"addr1": "3600 Robson Street"},
        {"addr2": "Vancouver, B.C."},
        {"addr3": "V7E 9Y8"},
        {"phone": "778-223-4400"},
        {"fax": "778-223-4401"},
        {"contact": "contact@weevr.io"},
        {"profile": [{"business": "online commerce"}]},
        {"timestamp": "1579568668230476"}
      ]}
    }},
    726
    {"offer": {
      "data": {"offer": [
        {"name": "Offer 123"},
        {"legal_reference": "AA0322K12201"},
        {"valid_not_before": "1579598500"},
        {"valid_not_after": "1579569800"},
        {"taxonomy_1": "all,forsale,shoes,brand,nike"},
        {"taxonomy_2": "all,forsale,shoes,sports,basketball"},
        {"influencer_black_list": [
          "9c438fb9790e5eb542527b9be8b1222806716f7839283f7f2faa784e87fff1fe",
          "8252ea277ebbe5a99e7368c1a0fa96c3f5105b3c03c5dd11f555490ee20ca335"
        ]},
        {"compensation": [
          {"payout_max": "100"},
```

```
            {"currency": "cad"}
         ]},
         {"timestamp": "1579568669000321"}
      ]}
   ]},
   {"timestamp": "1579568669268358"}
]}
}
```

Below, its compact representation in JSON for the "Published Offer 123" statement for its vendor and publisher fields, for illustration. Here the "Offer 123" statement is illustrated as remaining in-situ contained data of "Published Offer 123" statement. Alternatively, a compact format for "Offer 123" statement using a content hash may be substituted for additional compactness, as described earlier.

```
{
"uid": "3a4269309ec24459fe26724c6ed85b76b3fd001934771b76cb60971dd4cc77fc",
   "data": {"published_offer": [
      {"vendor": {"reference": {"uid":
"4c2f6296bf6accf5003ecd019aacd1b3d0e485586a10fc8fead719f291a1bb03"}}},
      {"publisher": {"reference": {"uid":
"1fe63d74cc177ed5652a5b9d02172365302a3021b2f39919793c673a31f84094"}}},
      {"offer": {"data": {"offer": [
         {"name": "Offer 123"},
         {"legal_reference": "AA0322K12201"},
         {"valid_not_before": "1579598500"},
         {"valid_not_after": "1579569800"},
         {"taxonomy_1": "all,forsale,shoes,brand,nike"},
         {"taxonomy_2": "all,forsale,shoes,sports,basketball"},
         {"influencer_black_list": [
            "9c438fb9790e5eb542527b9be8b1222806716f7839283f7f2faa784e87fff1fe",
            "8252ea277ebbe5a99e7368c1a0fa96c3f5105b3c03c5dd11f555490ee20ca335"
         ]},
         {"compensation": [
            {"payout_max": "100"},
            {"currency": "cad"}
         ]},
         {"timestamp": "1579568669000321"}
      ]}}},
      {"timestamp": "1579568669268358"}
   ]}
}
```

Figure 8:
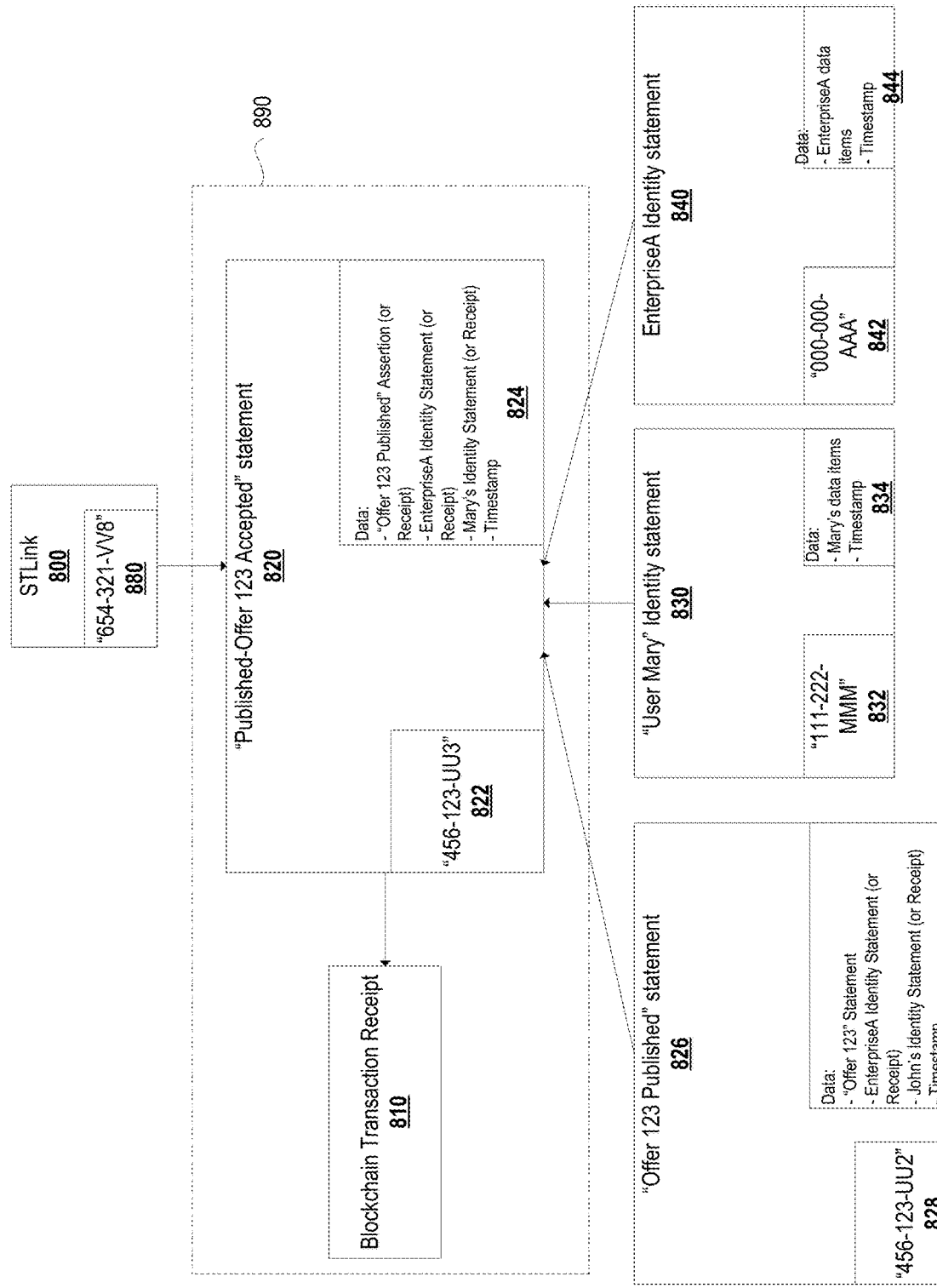
FIG. 8 is a diagram of an exemplary STLink instance representing an event where a user, a marketer, has accepted a published offer in the system, according to some embodiments.

FIG. 8 is a block diagram of an exemplary STLink instance 800, illustrative of an assertion 890 by the system's recording an acceptance statement 820 (in marketing, of a published offer—an marketer's acceptance to promote an offer), according to some embodiments. Assertion 890 is a statement with three child statements (at leaf level) but a seven-node tree due to the child statement 826 being a four-node tree (see 720 of FIG. 7), in addition to statements 830 and 840.

```
820
{
   822
   "uid": "b267da4975dc6fd513e0d8124184ff3e9a8b165d7beea5d1d8a9cd9316d71bf7",
   824
   "data": {
      "promoted_offer": {
         830
         "promoted_by": {
            "uid": "f8c5f1df23e3ce8367113f41c91ac04e642fe90097bda6262ac8a14e7e5d57e9",
            "data": {"person": [
               {"first": "Mary"},
               {"last": "Jane"},
               {"addr1": "213 Powell Street"},
               {"addr2": "Vancouver, B.C."},
               {"addr3": "V7B 1E6"},
```

```
            {"profile": [
                {"occupation": "sporting goods influencer"}
            ]},
            {"timestamp": "1579568668749997"}
        ]}
    },
    840
    "clearing_house": {
        "uid": "1fe63d74cc177ed5652a5b9d02172365302a3021b2f39919793c673a31f84094",
        "data": {"enterprise": [
            {"name": "Weevr Inc."},
            {"addr1": "3600 Robson Street"},
            {"addr2": "Vancouver, B.C."},
            {"addr3": "V7E 9Y8"},
            {"phone": "778-223-4400"},
            {"fax": "778-223-4401"},
            {"contact": "contact@weevr.io"},
            {"profile": [{"business": "online commerce"}]},
            {"timestamp": "1579568668230476"}
        ]}
    },
    826
    "published_offer": [
        {"vendor": {
            "uid": "4c2f6296bf6accf5003ecd019aacd1b3d0e485586a10fc8fead719f291a1bb03",
            "data": {"person": [
                {"first": "John"},
                {"last": "Doe"},
                {"addr1": "1122 Water Street"},
                {"addr2": "Vancouver, B.C."},
                {"addr3": "V5M 2N6"},
                {"profile": [
                    {"occupation": "self-employed"}
                ]},
                {"timestamp": "1579569554516678"}
            ]}
        }},
        {"publisher": {
            "uid": "1fe63d74cc177ed5652a5b9d02172365302a3021b2f39919793c673a31f84094",
            "data": {"enterprise": [
                {"name": "Weevr Inc."},
                {"addr1": "3600 Robson Street"},
                {"addr2": "Vancouver, B.C."},
                {"addr3": "V7E 9Y8"},
                {"phone": "778-223-4400"},
                {"fax": "778-223-4401"},
                {"contact": "contact@weevr.io"},
                {"profile": [{"business": "online commerce"}]},
                {"timestamp": "1579568668230476"}
            ]}
        }},
        {"offer": {
            "data": {"offer": [
                {"name": "Offer 123"},
                {"legal_reference": "AA0322K12201"},
                {"valid_not_before": "1579598500"},
                {"valid_not_after": "1579569800"},
                {"taxonomy_1": "all,forsale,shoes,brand,nike"},
                {"taxonomy_2": "all,forsale,shoes,sports,basketball"},
                {"influencer_black_list": [
                    "9c438fb9790e5eb542527b9be8b1222806716f7839283f7f2faa784e87fff1fe",
                    "8252ea277ebbe5a99e7368c1a0fa96c3f5105b3c03c5dd11f555490ee20ca335"
                ]},
                {"compensation": [
                    {"payout_max": "100"},
                    {"currency": "cad"}
                ]},
                {"timestamp": "1579568669000321"}
            ]}
        }},
        {"timestamp": "1579568669268358"}
    ]
    },
    "timestamp": "1579568669550064"
}
```

Below, a compact representation for 820:

```
{
  "uid": "b267da4975dc6fd513e0d8124184ff3e9a8b165d7beea5d1d8a9cd9316d71bf7",
  "data": {
    "promoted_offer": {
      "promoted_by": {"reference": {"uid":
"f8c5f1df23e3ce8367113f41c91ac04e642fe90097bda6262ac8a14e7e5d57e9"}},
      "clearing_house": {"reference": {"uid":
"1fe63d74cc177ed5652a5b9d02172365302a3021b2f39919793c673a31f84094"}},
      "published_offer": {"reference": {"uid":
"3a4269309ec24459fe26724c6ed85b76b3fd001934771b76cb60971dd4cc77fc"}}
    },
    "timestamp": "1579568669550064"
  }
}
```

FIG. 9 is a block diagram of an exemplary STLink instance 900, illustrative of an assertion 990 by the system's recording a consumer action statement 920 (on a promoted offer, e.g., a purchase), according to some embodiments. Assertion 890 is a statement with three child statements (at leaf level) but a ten-node tree where assertion 926 contributes seven nodes.

```
920
{
  922
  "uid": "ff1600a95b927f8fe358319337ee5b1a4a5bcae42d7610fd761ac0975a5b9dbe",
  924
  "data": {
    930
    "clicked_by": {
      932
      "uid": "b343d71686a75251a04384b9263cde3225175e6cb87ae8965ef03218b664066a",
      934
      "data": {"click_source": [
        {"ip": "201.112.33.5"},
        {"click_timestamp": "1579568661010101"},
        {"user_agent": "Mozilla/5.0 (Windows NT 10.0; Win64; x64; rv:72.0)
Gecko/20100101 Firefox/72.0"},
        {"app_version": "5.0 (Windows)"},
        {"geolocation": "51.5131010,-0.122405"},
        {"timestamp": "1579568670143131"}
      ]}
    },
    926
    "promoted_offer": {
      928
      "uid": "b267da4975dc6fd513e0d8124184ff3e9a8b165d7beea5d1d8a9cd9316d71bf7",
      929
      "data": {
        "promoted_offer": {
          "promoted_by": {
            "uid": "f8c5f1df23e3ce8367113f41c91ac04e642fe90097bda6262ac8a14e7e5d57e9",
            "data": {"person": [
              {"first": "Mary"},
              {"last": "Jane"},
              {"addr1": "213 Powell Street"},
              {"addr2": "Vancouver, B.C."},
              {"addr3": "V7B 1E6"},
              {"profile": [
                {"age": "50"},
                {"occupation": "sporting goods influencer"}
              ]},
              {"timestamp": "1579568668749997"}
            ]}
          },
          "clearing_house": {
            "uid": "1fe63d74cc177ed5652a5b9d02172365302a3021b2f39919793c673a31f84094",
            "data": {"enterprise": [
              {"name": "Weevr Inc."},
              {"addr1": "3600 Robson Street"},
              {"addr2": "Vancouver, B.C."},
              {"addr3": "V7E 9Y8"},
              {"phone": "778-223-4400"},
              {"fax": "778-223-4401"},
```

-continued

```
            {"contact": "we.coyote@acmeforyou.com"},
            {"profile": [{"business": "online commerce"}]},
            {"timestamp": "1579568668230476"}
         ]}
      },
      "published_offer": {
         "uid": "3a4269309ec24459fe26724c6ed85b76b3fd001934771b76cb60971dd4cc77fc",
         "data": {"published_offer": [
            {"vendor": {
               "uid": "4c2f6296bf6accf5003ecd019aacd1b3d0e485586a10fc8fead719f291a1bb03",
               "data": {"person": [
                  {"first": "John"},
                  {"last": "Doe"},
                  {"addr1": "1122 Water Street"},
                  {"addr2": "Vancouver, B.C."},
                  {"addr3": "V5M 2N6"},
                  {"profile": [
                     {"age": "42"},
                     {"status": "single"},
                     {"occupation": "self-employed"}
                  ]},
                  {"timestamp": "1579569554516678"}
               ]}
            }},
            {"publisher": {
               "uid": "1fe63d74cc177ed5652a5b9d02172365302a3021b2f39919793c673a31f84094",
               "data": {"enterprise": [
                  {"name": "Weevr Inc."},
                  {"addr1": "3600 Robson Street"},
                  {"addr2": "Vancouver, B.C."},
                  {"addr3": "V7E 9Y8"},
                  {"phone": "778-223-4400"},
                  {"fax": "778-223-4401"},
                  {"contact": "contact@weevr.io"},
                  {"profile": [{"business": "online commerce"}]},
                  {"timestamp": "1579568668230476"}
               ]}
            }},
            {"offer": {"data": {"offer": [
               {"name": "Offer 123"},
               {"legal_reference": "AA0322K12201"},
               {"valid_not_before": "1579598500"},
               {"valid_not_after": "1579569800"},
               {"taxonomy_1": "all,forsale,shoes,brand,nike"},
               {"taxonomy_2": "all,forsale,shoes,sports,basketball"},
               {"influencer_black_list": [
                  "9c438fb9790e5eb542527b9be8b1222806716f7839283f7f2faa784e87fff1fe",
                  "8252ea277ebbe5a99e7368c1a0fa96c3f5105b3c03c5dd11f555490ee20ca335"
               ]},
               {"compensation": [
                  {"payout_max": "100"},
                  {"currency": "cad"}
               ]},
               {"timestamp": "1579568669000321"}
            ]}}},
            {"timestamp": "1579568669268358"}
         ]}
      }
   },
   "timestamp": "1579568669550064"
   }
  },
  "timestamp": "1579568669847610"
 }
}
```

Below, a compact representation for 920:

```
{
   "uid": "ff1600a95b927f8fe358319337ee5b1a4a5bcae42d7610fd761ac0975a5b9dbe",
   "data": {
      "clicked_by": {"reference": {"uid": "b343d71686a75251a04384b9263cde3225175e6cb87ae8965ef03218b664066a"}},
      "promoted_offer": {"reference": {"uid":
```

-continued

```
"b267da4975dc6fd513e0d8124184ff3e9a8b165d7beea5d1d8a9cd9316d71bf7"}},
    "timestamp": "1579568669847610"
  }
}
```

Semantics are not lost in this compact representation and a full representation can be recovered by traversing into the m-ary tree whose root starts at 922 and resolving all reference elements encountered.

For illustration completeness, event 920 may be externalized with the following STLink presentation (no unique number used in the STLink in this illustration):

```
{
  "data": { "reference": {"uid":
"ff1600a95b927f8fe358319337ee5b1a4a5bcae42d7610fd761ac0975a5b9dbe"}}
}
```

Figure 10:
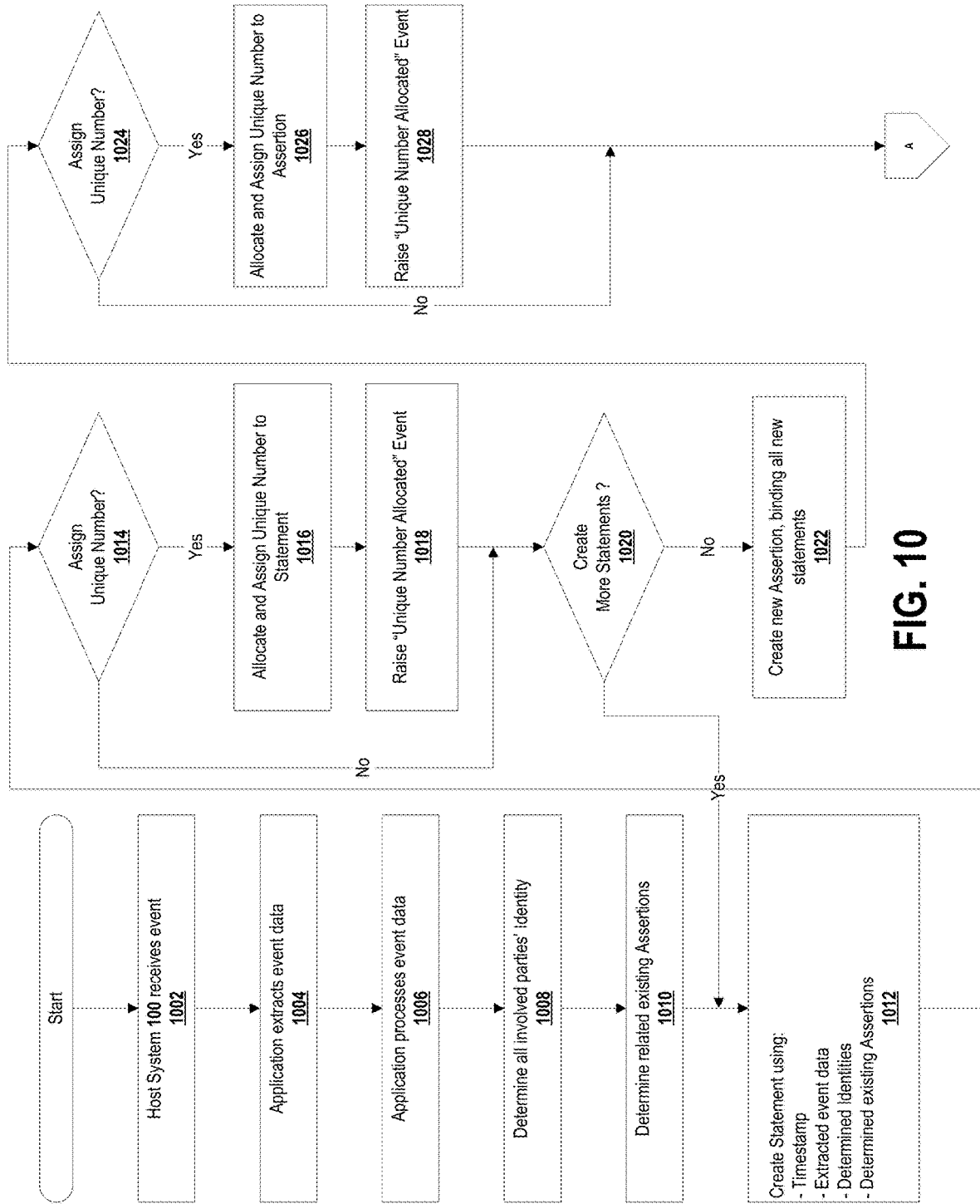
FIGS. 10 and 11 are flowcharts of the steps in an STLink's creation resulting from an event's processing, according to some embodiments.
Figure 11:
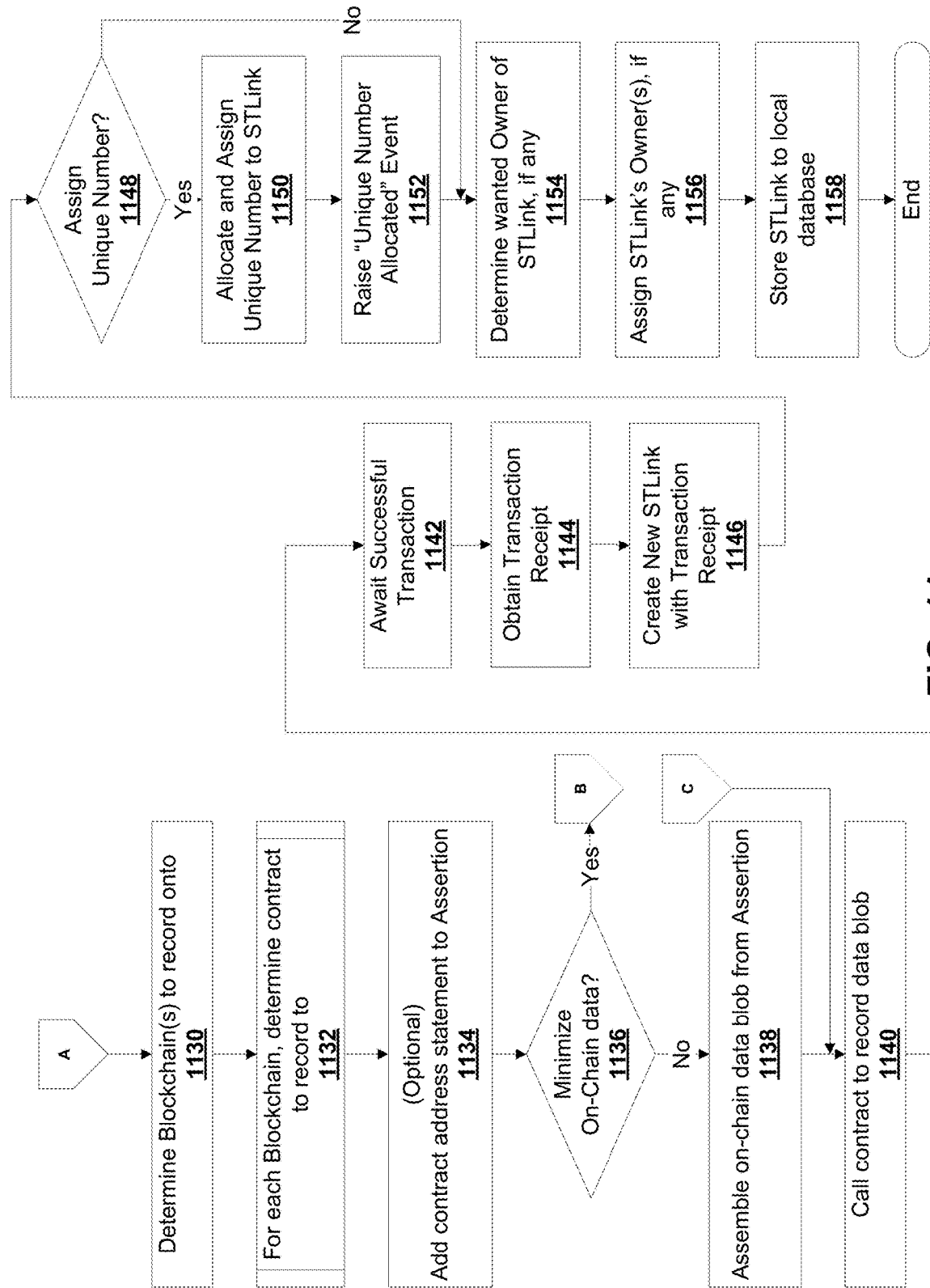

FIG. 10 and FIG. 11 are flowcharts illustrating an exemplary method of the steps in an STLink's creation resulting from an event's processing, according to some embodiments. The host system 100 receives event 1002, determines the designated application to handle it and routes to it where the event's data is extracted 1004 and processed 1006. As part of the processing, the application determines any identities and assertions conveyed in the event data.

A statement is created 1012 and depending on the application context a unique number assigned to each statement. Because of the need to satisfy the same irrevocability and auditability requirements, a "unique-number-allocated" event is raised at 1016 and 1018 to further trigger the system to record it onto the blockchain in a separate iteration of this flowchart. More statements may be created 1020 as application requirements dictate.

The application creates a new assertion 1022, i.e. intent at this point is to mine it onto a blockchain, to bind all new statements, determined identities and other existing assertions/statements required by application context, a timestamp, and assign it a unique number. All assertions are assigned a unique number but step 1024 leaves open in the method to permit exceptional cases where none is required or wanted.

In FIG. 11, the application returns the assertion(s) to the system for recording onto a blockchain. The method accommodates recording to more than one blockchain concurrently 1130. For each blockchain selected, the contract to use for the transaction is selected 1132 and optionally its contract address is added as an additional statement to the assertion in step 1134.

Figure 12:
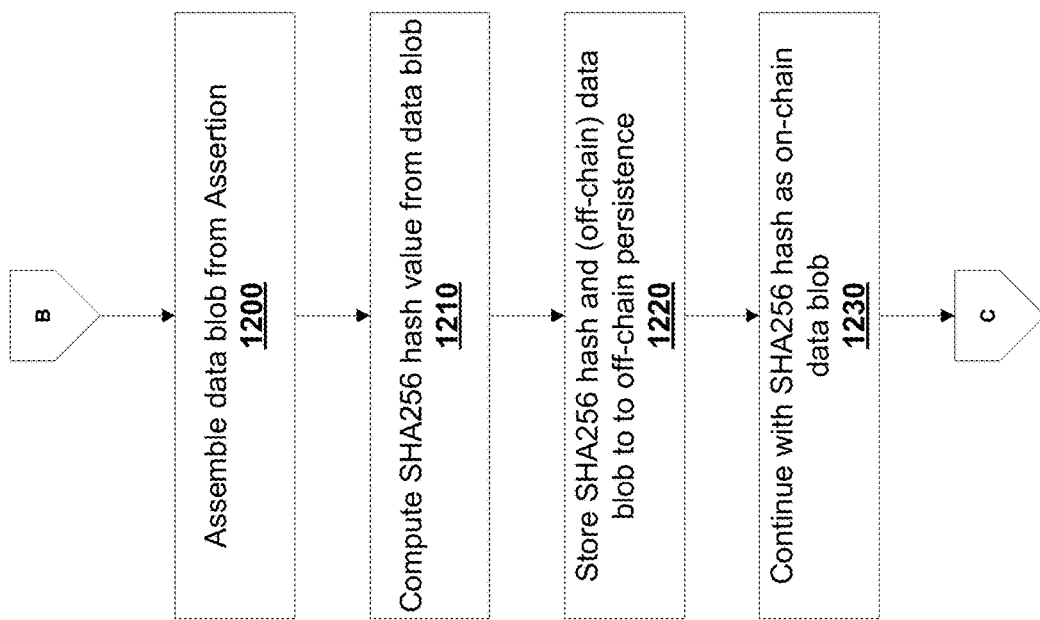
FIG. 12 is a flowchart of the steps in a method that is adapted for minimizing amount of data put onto a blockchain while retaining provablilty and auditability of the original event content, according to some embodiments. SHA256 is illustrated as only one such transformation—other hash algorithms can be employed.

Because the size of an assertion can be large and the cost of on-chain storage is expensive, a method 1136 to transform an assertion's data to minimize its on-chain portion may be triggered. FIG. 12 is an exemplary method for such a data transformation. This on-chain data minimization step returns with a data blob in step 1140 that is a fraction of the one serialized from step 1138 if no data transformation was selected.

Using the selected contract from step 1132, the system submits the data blob to a blockchain selected in step 1130 in a transaction 1140, and awaits its outcome 1142. When completed, the blockchain returns a transaction receipt 1144 and if the transaction succeeded, the system creates an STLink 1146, optionally assigns a unique number 1150 as its identity.

Based on application need and/or system design goals, the system determines 1154 and assigns 1156 the identities to be associated with the STLink identity, as the latter's owners. In some embodiments, STLink ownership is strictly an application concept, therefore not required in the creation and operation of STLink. Where the STLink is assigned a unique number, similar to the case of a statement above, a "unique-number-assigned" event is raised. Where ownership is applied and if provable auditability of ownership is also wanted, this can be achieved as yet another statement where STLink(s) and owners' identities are bound and mined to an assertion.

FIG. 12 is a flowchart illustrating an exemplary method for a set of the steps to transform an assertion's data content so as to achieve the goal of minimizing the amount of on-chain data from an assertion.

A requirement is the method's preservation of irrefutably and provability that the on-chain and off-chain data are uniquely related. In this exemplary method, this is accomplished by performing a SHA256 hash 1210 of the assertion's complete data content 1200.

The generated hash value continues as the on-chain data with the original assertion data content stored in an off-chain database 1220 with the hash as its key for fast lookup and correspondence to its counterpart that is stored on the blockchain.

Figure 13:
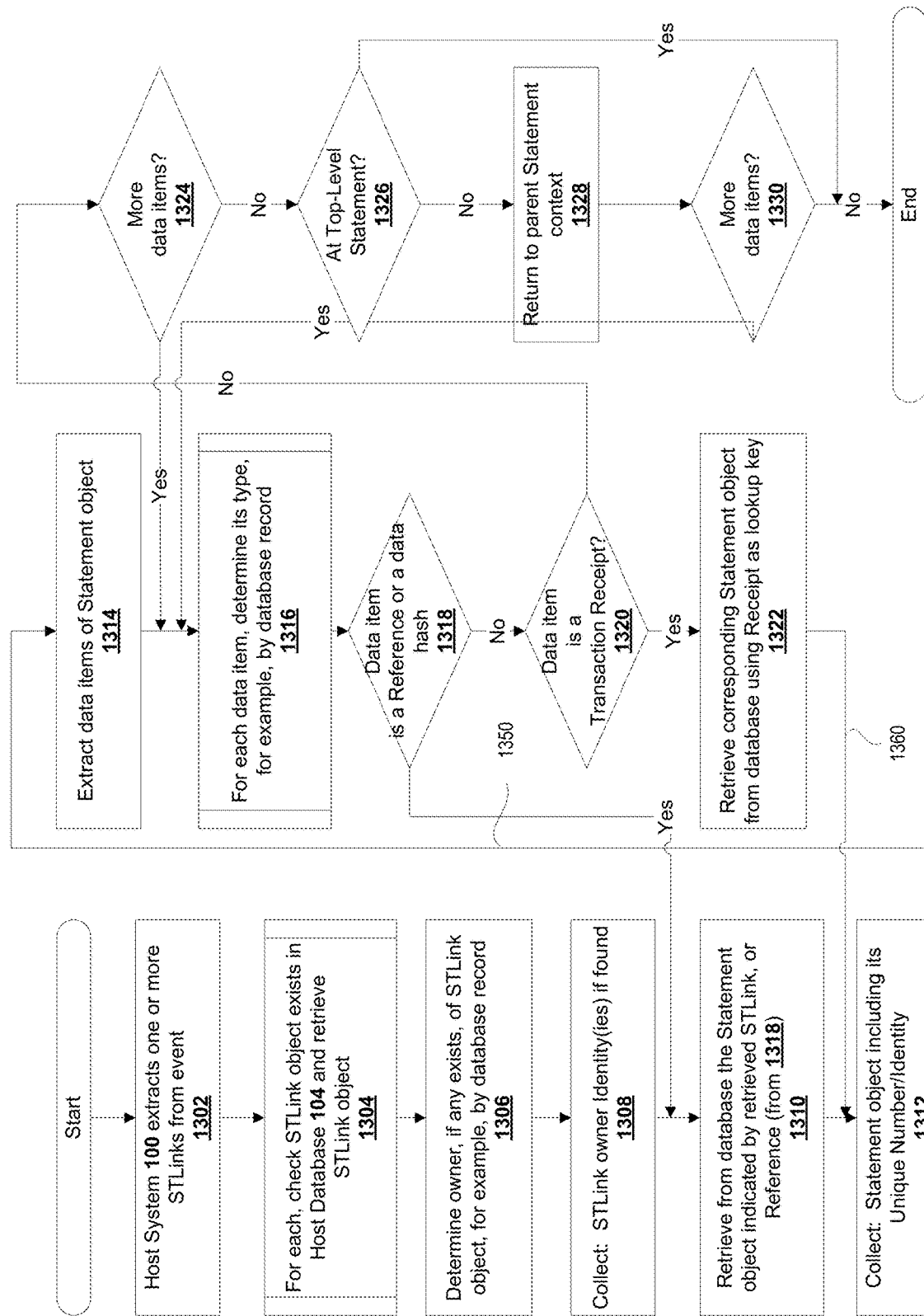
FIG. 13 is a flowchart of the steps in a method of FIG. 10, according to some embodiments.

FIG. 13 a flowchart illustrating an exemplary method of the steps to determine all identities and assertions that pre-exist in the system and that are relevant to the event's processing. They may be traced and identified from an STLink conveyed in an event. This flowchart is an elaboration of steps 1008 and 1010 of FIG. 10. The system receives an event extracts its data content 1302. First the system checks the STLink's validity.

It is valid (step 1304) if it exists in the system's off-chain database, has not been administratively locked, and other custom criteria. If one or more owners of the STLink were previously assigned, they are determined and retrieved by a query 1306 to the off-chain store (database) and collected.

Any direct owners of an STLink are associated with an identity embodied by an STLink's unique number. Additional identities are extracted from the traversal of the m-ary tree rooted at the the top-level statement 1310 pointed to by the STLink. Though customarily an STLink points to one statement, the method of the invention allows an STLink to point to a set of statements. A retrieved statement's unique number, its identity, is collected at step 1312.

A statement's data collection is extracted at step 1314 and iterated at step 1316. Where a data item can be interpreted to be an identity-only statement used as a reference or a transaction receipt at steps 1318, 1320, more identities and/or statements/assertions may be contained within it. If a data item is an statement, the method stacks the current statement processing level, and recurses into the child statement at step 1350.

If the data item is a transaction receipt or an identity-only statement used as a reference, the corresponding statement or reference is queried at step 1322 in the off-chain store (database) with the receipt, and the statement recursed at step 1360. This recursion completes when all paths of the top-level statement's node tree are traversed at steps 1324, 1326, 1328, 1330. All identities and statements are collected when traversal is complete.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for tracking one or more data linkages between one or more data structures stored on one or more external public blockchains, the system comprising:
    a processor operating in conjunction with computer memory, the processor configured to:
    integrate with an external public blockchain of the one or more external public blockchains to identify that an event has occurred based at least on data records corresponding to transactions stored on the external public blockchain;
    generate an assertion data object from the data records corresponding to the transactions of the event, the assertion data object including an underlying set of one or more associated statement data objects represented in a data payload associated with the assertion data object, each of the one or more statement data objects being allocated a corresponding separate unique value;
    store the assertion data object on an off-chain database;
    record a data representation of the assertion data object including the unique value corresponding to the assertion data object as a transaction on the external public blockchain;
    store, on the off-chain database, a representation of a transaction recordal receipt with the recorded data representation of the assertion data object;
    associate the transaction recordal receipt with the assertion data object and the unique value corresponding to the assertion data object; and
    generate and store on the off-chain database, the one or more data linkages between the unique values corresponding to the assertion data object and the underlying set of one or more associated statement data objects as interconnected nodes of a cross-referenceable data structure tree;
    wherein the cross-referenceable data structure and the one or more data linkages are traversable to identify the one or more data structures stored on the one or more external public blockchains relating to a specific unique value.

2. The system of claim 1, wherein the one or more unique values are generated temporally proximate to the identification that the event has occurred.

3. The system of claim 1, wherein the one or more unique values are pre-mined in pools and the allocation of the unique value includes obtaining the unique value from a pre-mined pool.

4. The system of claim 1, wherein the unique value corresponding to the assertion data object is linked to a unique value corresponding to an owner profile, and the cross-referenceable data structure and the one or more data linkages are traversable using recursion based on the unique value corresponding to the owner profile to identify all transactions stored on the external public blockchain associated with the owner profile.

5. The system of claim 4, wherein the traversal is initiated from an initial node of the cross-referenceable data structure and includes an ordered traversal of one or more subtrees linked to the initial node.

6. The system of claim 4, wherein the processor is further configured to confirm all identified transactions stored on the external public blockchain associated with the owner profile, and in response to a successful confirmation, transmit a control signal indicative of a release of assets quantified based at least on the corresponding data payloads of identified assertion data objects.

7. The system of claim 1, wherein each of the one or more statement data objects are also mined onto the external public blockchain and the corresponding representations in the data payload are transaction recordal receipts corresponding to the mining of each of the one or more statement data objects.

8. The system of claim 1, wherein the one or more statement data objects include transaction information associated with one or more web-based tracking tags.

9. The system of claim 1, wherein the cross-referenceable data structure is a tree with unbound root depth.

10. The system of claim 1, wherein the transaction recordals are conducted against different external public blockchains of the one or more external public blockchains, and the traversal includes accessing the different external public blockchains.

11. A method for tracking one or more data linkages between one or more data structures stored on one or more external public blockchains, the method comprising:
    integrating with an external public blockchain of the one or more external public blockchains to identify that an event has occurred based at least on data records corresponding to transactions stored on the external public blockchain;
    generating an assertion data object from the data records corresponding to the transactions of the event, the assertion data object including an underlying set of one or more associated statement data objects represented in a data payload associated with the assertion data object, each of the one or more statement data objects being allocated a corresponding separate unique value;

storing the assertion data object on an off-chain database;

recording a data representation of the assertion data object including the unique value corresponding to the assertion data object as a transaction on the external public blockchain;

storing, on the off-chain database, a representation of a transaction recordal receipt with the recorded data representation of the assertion data object;

associating the transaction recordal receipt with the assertion data object and the unique value corresponding to the assertion data object; and generating and storing on the off-chain database, the one or more data linkages between the unique values corresponding to the assertion data object and the underlying set of one or more associated statement data objects as interconnected nodes of a cross-referenceable data structure;

wherein the cross-referenceable data structure and the one or more data linkages are traversable to identify the one or more data structures stored on the one or more external public blockchains relating to a specific unique value.

12. The method of claim 11, wherein the one or more unique values are generated temporally proximate to the identification that the event has occurred.

13. The method of claim 11, wherein the one or more unique values are pre-mined in pools and the allocation of the unique value includes obtaining the unique value from a pre-mined pool.

14. The method of claim 11, wherein the unique value corresponding to the assertion data object is linked to a unique value corresponding to an owner profile, and the cross-referenceable data structure and the one or more data linkages are traversable using recursion based on the unique value corresponding to the owner profile to identify all transactions stored on the external public blockchain associated with the owner profile.

15. The method of claim 14, wherein the traversal is initiated from an initial node of the cross-referenceable data structure and includes an ordered traversal of one or more subtrees linked to the initial node.

16. The method of claim 14, comprising confirming all identified transactions stored on the external public blockchain associated with the owner profile; and in response to a successful confirmation, transmitting a control signal indicative of a release of assets quantified based at least on the corresponding data payloads of identified assertion data objects.

17. The method of claim 11, wherein each of the one or more statement data objects are also mined onto the external public blockchain and the corresponding representations in the data payload are transaction recordal receipts corresponding to the mining of each of the one or more statement data objects.

18. The method of claim 11, wherein the one or more statement data objects include transaction information associated with one or more web-based tracking tags.

19. The method of claim 11, wherein the transaction recordals are conducted against different external public blockchains of the one or more external public blockchains, and the traversal includes accessing the different external public blockchains.

20. A non-transitory computer readable medium, storing machine interpretable instructions which when executed by a processor, cause the processor to perform a method for tracking one or more data linkages between one or more data structures stored on one or more external public blockchains, the method comprising:

integrating with an external public blockchain of the one or more external public blockchains to identify that an event has occurred based at least on data records corresponding to transactions stored on the external public blockchain;

generating an assertion data object from the data records corresponding to the transactions of the event, the assertion data object including an underlying set of one or more associated statement data objects represented in a data payload associated with the assertion data object, each of the one or more statement data objects being allocated a corresponding separate unique value;

storing the assertion data object on an off-chain database;

recording a data representation of the assertion data object including the unique value corresponding to the assertion data object as a transaction on the external public blockchain;

storing, on the off-chain database, a representation of a transaction recordal receipt with the recorded data representation of the assertion data object;

associating the transaction recordal receipt with the assertion data object and the unique value corresponding to the assertion data object; and generating and storing on the off-chain database, the one or more data linkages between the unique values corresponding to the assertion data object and the underlying set of one or more associated statement data objects as interconnected nodes of a cross-referenceable data structure;

wherein the cross-referenceable data structure and the one or more data linkages are traversable to identify the one or more data structures stored on the one or more external public blockchains relating to a specific unique value.

* * * * *